United States Patent
Gross et al.

(10) Patent No.: US 8,175,245 B2
(45) Date of Patent: *May 8, 2012

(54) SINGLE TELEPHONE NUMBER ACCESS TO MULTIPLE COMMUNICATIONS SERVICES

(75) Inventors: Karen A. Gross, Cedar Rapids, IA (US); Thomas J. Galvan, Hawatha, IA (US); Rupika Chib, Chevy Chase, MD (US)

(73) Assignee: Yolab Networks, L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,538

(22) Filed: Jan. 27, 2010

(65) Prior Publication Data
US 2010/0189237 A1 Jul. 29, 2010

Related U.S. Application Data

(60) Continuation of application No. 10/423,203, filed on Apr. 25, 2003, now Pat. No. 7,831,029, which is a division of application No. 09/413,846, filed on Oct. 7, 1999, now Pat. No. 6,795,532, which is a division of application No. 08/925,447, filed on Sep. 8, 1997, now abandoned.

(51) Int. Cl.
*H04M 3/42* (2006.01)
(52) U.S. Cl. ............... 379/207.02; 379/88.13; 379/88.2; 379/93.01; 379/207.15; 379/243; 379/372; 455/415; 455/417; 709/201
(58) Field of Classification Search .......... 370/259–271, 370/351–356; 348/14.01–14.16; 709/201–207, 709/217–232
See application file for complete search history.

(56) References Cited

U.S. PATENT DOCUMENTS

| | | | |
|---|---|---|---|
| 3,506,791 A | 4/1970 | Halaby |
| 3,676,603 A | 7/1972 | Budrys et al. |
| 3,854,013 A | 12/1974 | Altenburger et al. |
| 3,959,600 A | 5/1976 | Sousa |
| 3,997,731 A | 12/1976 | Wilmot et al. |
| 4,054,756 A | 10/1977 | Comella et al. |
| 4,065,642 A | 12/1977 | McClure |
| 4,072,824 A | 2/1978 | Phillips |
| 4,086,438 A | 4/1978 | Kahn et al. |
| 4,263,480 A | 4/1981 | Levine |

(Continued)

FOREIGN PATENT DOCUMENTS
EP 0 152 908 8/1985
(Continued)

OTHER PUBLICATIONS

"Full-Time Fax Forwarding," Macworld, May 1993, p. 81.
(Continued)

*Primary Examiner* — Hemant Patel

(57) ABSTRACT

A platform provides access to multiple telecommunications services via a single telephone number. These services may include, for example, voicemail services, facsimile messaging services, paging services, and outbound calling services. A guest caller may call the single phone number to speak to a subscriber, leave a voicemail message for a subscriber, leave a facsimile message for a subscriber, or place a page to a subscriber. A subscriber may call the phone number to place outbound calls. In addition, a subscriber may call the single phone number to retrieve or send facsimile messages and/or voicemail messages. A subscriber may also call the phone number to configure service options. For instance, a subscriber may select routing options and choose what services are available to guest callers.

20 Claims, 19 Drawing Sheets

U.S. PATENT DOCUMENTS

| | | | |
|---|---|---|---|
| 4,266,098 A | 5/1981 | Novak | |
| 4,277,649 A | 7/1981 | Sheinbein | |
| 4,278,844 A | 7/1981 | Jones | |
| 4,313,035 A | 1/1982 | Jordan et al. | |
| 4,369,339 A | 1/1983 | Castro et al. | |
| 4,420,656 A | 12/1983 | Freeman | |
| 4,475,009 A | 10/1984 | Rais et al. | |
| 4,488,005 A | 12/1984 | Frantz | |
| 4,578,540 A | 3/1986 | Borg et al. | |
| 4,591,664 A | 5/1986 | Freeman | |
| 4,611,094 A | 9/1986 | Asmuth et al. | |
| 4,611,096 A | 9/1986 | Asmuth et al. | |
| 4,625,081 A | 11/1986 | Lotito et al. | |
| 4,670,628 A | 6/1987 | Boratgis et al. | |
| 4,674,115 A | 6/1987 | Kaleita et al. | |
| 4,737,976 A | 4/1988 | Borth et al. | |
| 4,747,124 A | 5/1988 | Ladd | |
| 4,752,951 A | 6/1988 | Konneker | |
| 4,783,796 A | 11/1988 | Ladd | |
| 4,790,003 A | 12/1988 | Kepley et al. | |
| 4,814,763 A | 3/1989 | Nelson et al. | |
| 4,821,308 A | 4/1989 | Hashimoto | |
| 4,823,123 A | 4/1989 | Siwiak | |
| 4,847,890 A | 7/1989 | Solomon et al. | |
| 4,875,038 A | 10/1989 | Siwiak et al. | |
| 4,878,240 A | 10/1989 | Lin et al. | |
| 4,893,329 A | 1/1990 | O'Brien | |
| 4,893,335 A | 1/1990 | Fuller et al. | |
| 4,899,373 A | 2/1990 | Lee et al. | |
| 4,920,562 A | 4/1990 | Hird et al. | |
| 4,926,462 A | 5/1990 | Ladd et al. | |
| 4,930,152 A | 5/1990 | Miller | |
| 4,932,042 A | 6/1990 | Baral et al. | |
| 4,933,965 A | 6/1990 | Hird et al. | |
| 4,935,956 A | 6/1990 | Hellwarth et al. | |
| 4,942,598 A | 7/1990 | Davis | |
| 4,955,047 A | 9/1990 | Morganstein et al. | |
| 4,961,216 A | 10/1990 | Baehr et al. | |
| 5,018,191 A | 5/1991 | Catron et al. | |
| 5,020,095 A | 5/1991 | Morganstein et al. | |
| 5,027,384 A | 6/1991 | Morganstein | |
| 5,029,196 A | 7/1991 | Morganstein | |
| 5,063,588 A | 11/1991 | Patsiokas et al. | |
| 5,090,051 A | 2/1992 | Muppidi et al. | |
| 5,115,326 A | 5/1992 | Burgess et al. | |
| 5,140,626 A | 8/1992 | Ory et al. | |
| 5,151,929 A | 9/1992 | Wolf | |
| 5,155,761 A | 10/1992 | Hammond | |
| 5,181,236 A | 1/1993 | LaVallee et al. | |
| 5,193,110 A | 3/1993 | Jones et al. | |
| 5,199,062 A | 3/1993 | Von Meister et al. | |
| 5,222,120 A | 6/1993 | McLeod et al. | |
| 5,222,125 A | 6/1993 | Creswell et al. | |
| 5,224,150 A | 6/1993 | Neustein | |
| 5,251,255 A | 10/1993 | Epley | |
| 5,260,986 A | 11/1993 | Pershan | |
| 5,268,957 A | 12/1993 | Albrecht | |
| 5,276,731 A | 1/1994 | Arbel et al. | |
| 5,291,546 A | 3/1994 | Giler et al. | |
| 5,307,399 A | 4/1994 | Dai et al. | |
| 5,309,512 A | 5/1994 | Blackmon et al. | |
| 5,315,636 A | 5/1994 | Patel | |
| 5,329,578 A * | 7/1994 | Brennan et al. | 379/211.03 |
| 5,339,156 A | 8/1994 | Ishii | |
| 5,375,161 A | 12/1994 | Fuller et al. | |
| 5,384,831 A * | 1/1995 | Creswell et al. | 379/114.05 |
| 5,394,463 A | 2/1995 | Fischell et al. | |
| 5,440,620 A * | 8/1995 | Slusky | 379/100.07 |
| 5,450,479 A | 9/1995 | Alesio et al. | |
| 5,471,519 A | 11/1995 | Howe et al. | |
| 5,483,580 A | 1/1996 | Brandman et al. | |
| 5,550,908 A | 8/1996 | Cai et al. | |
| 5,557,659 A | 9/1996 | Hyde-Thomson | |
| 5,561,703 A | 10/1996 | Arledge et al. | |
| 5,583,920 A | 12/1996 | Wheeler, Jr. | |
| 5,588,037 A | 12/1996 | Fuller et al. | |
| 5,590,186 A | 12/1996 | Liao et al. | |
| 5,608,786 A | 3/1997 | Gordon | |
| 5,621,727 A | 4/1997 | Vaudreuil | |
| 5,630,079 A | 5/1997 | McLaughlin | |
| 5,631,745 A | 5/1997 | Wong et al. | |
| 5,636,269 A | 6/1997 | Eisdorfer | |
| 5,652,789 A * | 7/1997 | Miner et al. | 379/201.01 |
| 5,661,783 A | 8/1997 | Assis | |
| 5,668,855 A | 9/1997 | Misholi et al. | |
| 5,675,375 A | 10/1997 | Riffee | |
| 5,675,507 A | 10/1997 | Bobo, II | |
| 5,717,741 A | 2/1998 | Yue et al. | |
| 5,740,231 A | 4/1998 | Cohn et al. | |
| 5,742,905 A | 4/1998 | Pepe et al. | |
| 5,751,792 A | 5/1998 | Chau et al. | |
| 5,752,191 A | 5/1998 | Fuller et al. | |
| 5,761,271 A | 6/1998 | Karnowski | |
| 5,764,730 A | 6/1998 | Rabe et al. | |
| 5,764,747 A * | 6/1998 | Yue et al. | 379/211.03 |
| 5,781,620 A * | 7/1998 | Montgomery et al. | 379/114.02 |
| 5,805,587 A | 9/1998 | Norris et al. | |
| 5,825,867 A | 10/1998 | Epler et al. | |
| 5,832,060 A | 11/1998 | Corlett et al. | |
| 5,836,009 A | 11/1998 | Diamond et al. | |
| 5,867,562 A | 2/1999 | Scherer | |
| 5,870,454 A | 2/1999 | Dahlen | |
| 5,870,549 A | 2/1999 | Bobo, II | |
| 5,872,926 A | 2/1999 | Levac et al. | |
| 5,873,032 A | 2/1999 | Cox et al. | |
| 5,894,504 A | 4/1999 | Alfred et al. | |
| 5,915,008 A | 6/1999 | Dulman | |
| 5,917,615 A | 6/1999 | Reifman et al. | |
| 5,917,817 A | 6/1999 | Dunn et al. | |
| 5,930,751 A * | 7/1999 | Cohrs et al. | 704/231 |
| 5,937,047 A | 8/1999 | Stabler | |
| 5,943,398 A | 8/1999 | Klein et al. | |
| 5,946,386 A | 8/1999 | Rogers et al. | |
| 5,948,059 A | 9/1999 | Woo et al. | |
| 5,953,407 A * | 9/1999 | Zhang et al. | 379/373.02 |
| 5,958,016 A | 9/1999 | Chang et al. | |
| 5,974,131 A | 10/1999 | Malik | |
| 5,974,133 A * | 10/1999 | Fleischer et al. | 379/230 |
| 5,983,095 A | 11/1999 | Cameron | |
| 5,987,100 A | 11/1999 | Fortman et al. | |
| 5,991,365 A | 11/1999 | Pizano et al. | |
| 5,999,525 A | 12/1999 | Krishnaswamy et al. | |
| 6,020,980 A | 2/2000 | Freeman | |
| 6,028,679 A | 2/2000 | Murphy | |
| 6,028,917 A | 2/2000 | Creamer et al. | |
| 6,028,921 A | 2/2000 | Malik et al. | |
| 6,028,922 A | 2/2000 | Deutsch et al. | |
| 6,038,296 A | 3/2000 | Brunson et al. | |
| 6,038,305 A | 3/2000 | McAllister et al. | |
| 6,064,723 A | 5/2000 | Cohn et al. | |
| 6,067,516 A | 5/2000 | Levay et al. | |
| 6,085,101 A | 7/2000 | Jain et al. | |
| 6,091,808 A | 7/2000 | Wood et al. | |
| 6,104,786 A | 8/2000 | Gibilisco et al. | |
| 6,144,644 A | 11/2000 | Bajzath et al. | |
| 6,157,706 A | 12/2000 | Rachelson | |
| 6,160,877 A | 12/2000 | Tatchell et al. | |
| 6,181,781 B1 | 1/2001 | Porter et al. | |
| 6,185,603 B1 | 2/2001 | Henderson et al. | |
| 6,185,683 B1 | 2/2001 | Ginter et al. | |
| 6,215,858 B1 | 4/2001 | Bartholomew et al. | |
| 6,226,668 B1 | 5/2001 | Silverman | |
| 6,226,690 B1 | 5/2001 | Banda et al. | |
| 6,230,189 B1 | 5/2001 | Sato et al. | |
| 6,233,318 B1 | 5/2001 | Picard et al. | |
| 6,243,374 B1 | 6/2001 | White et al. | |
| 6,278,532 B1 | 8/2001 | Heimendinger et al. | |
| 6,278,862 B1 | 8/2001 | Henderson | |
| 6,282,281 B1 | 8/2001 | Low | |
| 6,308,221 B1 | 10/2001 | Perlman et al. | |
| 6,330,079 B1 | 12/2001 | Dugan et al. | |
| 6,339,639 B1 | 1/2002 | Henderson | |
| 6,343,115 B1 | 1/2002 | Foladare et al. | |
| 6,350,066 B1 | 2/2002 | Bobo, II | |
| 6,366,661 B1 | 4/2002 | Devillier et al. | |
| 6,389,117 B1 * | 5/2002 | Gross et al. | 379/88.23 |
| 6,404,858 B1 | 6/2002 | Farris et al. | |

| | | | |
|---|---|---|---|
| 6,427,009 | B1 | 7/2002 | Reese |
| 6,427,064 | B1 | 7/2002 | Henderson |
| 6,445,694 | B1 | 9/2002 | Swartz |
| 6,498,841 | B2 | 12/2002 | Bull et al. |
| 6,532,230 | B1 | 3/2003 | Lung et al. |
| 6,587,867 | B1 | 7/2003 | Miller et al. |
| 6,630,630 | B1 | 10/2003 | Maezawa et al. |
| 6,633,630 | B1 | 10/2003 | Owens et al. |
| 6,680,999 | B1 * | 1/2004 | Garcia ................. 379/88.22 |
| 7,831,029 | B2 * | 11/2010 | Gross et al. ............. 379/207.02 |
| 2002/0028673 | A1 | 3/2002 | Chang et al. |
| 2002/0064149 | A1 | 5/2002 | Elliott et al. |
| 2003/0026400 | A1 | 2/2003 | Bashoura et al. |
| 2004/0100648 | A1 | 5/2004 | Kulakowski |
| 2004/0218226 | A1 | 11/2004 | Antognini et al. |
| 2006/0129511 | A1 | 6/2006 | Wu |

FOREIGN PATENT DOCUMENTS

| | | |
|---|---|---|
| EP | 0 216 381 | 4/1987 |
| EP | 0 216 515 | 4/1987 |
| EP | 0 330 441 | 8/1989 |
| GB | 2 198 910 | 6/1988 |

OTHER PUBLICATIONS

Advisory Action for U.S. Appl. No. 09/412,503, mailed Apr. 24, 2001.
Advisory Action for U.S. Appl. No. 09/413,844, mailed Mar. 7, 2007.
Advisory Action for U.S. Appl. No. 09/413,844, mailed Mar. 19, 2008.
Advisory Action for U.S. Appl. No. 09/414,261, mailed Aug. 23, 2005.
Advisory Action for U.S. Appl. No. 09/414,261, mailed Dec. 4, 2002.
Advisory Action for U.S. Appl. No. 10/423,203, mailed Aug. 14, 2008.
Advisory Action for U.S. Appl. No. 10/423,203, mailed Aug. 25, 2006.
Advisory Action for U.S. Appl. No. 10/423,203, mailed Sep. 19, 2007.
Advisory Action for U.S. Appl. No. 10/736,410, mailed Jul. 13, 2007.
An et al., "Direct Dialing of Credit Card Calls," 1981 International Conference on Communications, Denver, Colorado, Jun. 1981, pp. 44.1.1-44.1.5.
Final Office Action for U.S. Appl. No. 09/412,503, mailed Feb. 14, 2001.
Final Office Action for U.S. Appl. No. 09/413,844, mailed Jan. 8, 2008.
Final Office Action for U.S. Appl. No. 09/413,844, mailed Oct. 22, 2003.
Final Office Action for U.S. Appl. No. 09/413,844, mailed Nov. 14, 2006.
Final Office Action for U.S. Appl. No. 09/414,258, mailed Sep. 25, 2003.
Final Office Action for U.S. Appl. No. 09/414,261, mailed Apr. 7, 2005.
Final Office Action for U.S. Appl. No. 09/414,261, mailed Sep. 6, 2002.
Final Office Action for U.S. Appl. No. 09/414,262, mailed Sep. 24, 2003.
Final Office Action for U.S. Appl. No. 10/423,203, mailed Apr. 10, 2008.
Final Office Action for U.S. Appl. No. 10/423,203, mailed Jun. 23, 2006.
Final Office Action for U.S. Appl. No. 10/423,203, mailed Jun. 28, 2007.
Final Office Action for U.S. Appl. No. 10/736,410, mailed Apr. 24, 2007.
Kopec et al., "Electronic Business Telephone," GTE Automatic Electric Journal, Mar. 1981, pp. 34-40.
Non-Final Office Action for U.S. Appl. No. 09/413,844, mailed Apr. 4, 2006.
Non-Final Office Action for U.S. Appl. No. 09/413,844, mailed Apr. 9, 2003.
Non-Final Office Action for U.S. Appl. No. 09/413,844, mailed Aug. 3, 2006.
Non-Final Office Action for U.S. Appl. No. 09/413,844, mailed Sep. 14, 2007.
Non-Final Office Action for U.S. Appl. No. 09/413,844, mailed Oct. 6, 2005.
Non-Final Office Action for U.S. Appl. No. 09/413,845, mailed Feb. 14, 2001.
Non-Final Office Action for U.S. Appl. No. 09/413,845, mailed Jul. 31, 2001.
Non-Final Office Action for U.S. Appl. No. 09/413,845, mailed Sep. 12, 2000.
Non-Final Office Action for U.S. Appl. No. 09/413,845, mailed Oct. 6, 2003.
Non-Final Office Action for U.S. Appl. No. 09/413,846, mailed Jul. 18, 2003.
Non-Final Office Action for U.S. Appl. No. 09/414,258, mailed Apr. 10, 2003.
Non-Final Office Action for U.S. Appl. No. 09/414,261, mailed Feb. 14, 2003.
Non-Final Office Action for U.S. Appl. No. 09/414,261, mailed Mar. 15, 2002.
Non-Final Office Action for U.S. Appl. No. 09/414,261, mailed Sep. 17, 2001.
Non-Final Office Action for U.S. Appl. No. 09/414,261, mailed Sep. 30, 2004.
Non-Final Office Action for U.S. Appl. No. 09/414,262, mailed Mar. 27, 2003.
Non-Final Office Action for U.S. Appl. No. 09/414,262, mailed Jul. 30, 2002.
Non-Final Office Action for U.S. Appl. No. 10/423,203, mailed Feb. 22, 2006.
Non-Final Office Action for U.S. Appl. No. 10/423,203, mailed Apr. 7, 2009.
Non-Final Office Action for U.S. Appl. No. 10/423,203, mailed Dec. 8, 2006.
Non-Final Office Action for U.S. Appl. No. 10/423,203, mailed Dec. 12, 2007.
Non-Final Office Action for U.S. Appl. No. 10/736,410, mailed Apr. 19, 2006.
Non-Final Office Action for U.S. Appl. No. 10/736,410, mailed May 30, 2008.
Non-Final Office Action for U.S. Appl. No. 10/736,410, mailed Sep. 29, 2006.
Non-Final Office Action for U.S. Appl. No. 10/736,410, mailed Nov. 16, 2007.
Non-final Office Action on U.S. Appl. No. 10/423,203, mailed Oct. 10, 2008.
Notice of Allowance for U.S. Appl. No. 09/412,503, mailed Aug. 13, 2001.
Notice of Allowance for U.S. Appl. No. 09/412,503, mailed Nov. 1, 2001.
Notice of Allowance for U.S. Appl. No. 09/413,845, mailed Mar. 9, 2004.
Notice of Allowance for U.S. Appl. No. 09/413,845, mailed Jul. 29, 2002.
Notice of Allowance for U.S. Appl. No. 09/413,845, mailed Sep. 10, 2001.
Notice of Allowance for U.S. Appl. No. 09/413,846, mailed Mar. 22, 2004.
Notice of Allowance for U.S. Appl. No. 09/413,846, mailed Dec. 16, 2003.
Notice of Allowance for U.S. Appl. No. 09/414,258, mailed Dec. 16, 2003.
Notice of Allowance for U.S. Appl. No. 09/414,261, mailed Aug. 21, 2003.
Notice of Allowance for U.S. Appl. No. 09/414,261, mailed Nov. 4, 2005.
Notice of Allowance for U.S. Appl. No. 09/414,262, mailed Feb. 23, 2004.
Notice of Allowance for U.S. Appl. No. 10/736,410, mailed Sep. 27, 2005.
Notice of Allowance for U.S. Appl. No. 10/736,410, mailed Dec. 10, 2008.

Notice of Allowance of U.S. Appl. No. 10/423,203, mailed Feb. 22, 2010.
Notice of Allowance of U.S. Appl. No. 10/423,203, mailed Jun. 18, 2010.
Notice of Allowance of U.S. Appl. No. 10/423,203, mailed Oct. 28, 2009.
Office Action for U.S. Appl. No. 09/412,503, mailed Sep. 13, 2000.
Office Action for U.S. Appl. No. 09/412,503, mailed Jun. 20, 2001.
Office Communication for U.S. Appl. No. 09/413,844, mailed Sep. 10, 2008.
Office Communication for U.S. Appl. No. 09/414,261, mailed Jan. 2, 2003.
Perkins, Ed, How to Get BIG Discounts on Airfares, Hotels, Car Rentals, and More, Consumer Reports 1992 Travel Buying Guide, Consumer Reports Books, Yonkers, NY 1992, pp. 293-299.
Product Reference Guide: "SR 1000 PBX Digital Private Branch Exchange," Solid State Systems, Inc., Nov. 1987.
Rosenbaum, Ron, "Secrets of the Little Blue Box," Esquire magazine, Oct. 1971, p. 116.
Supplemental Notice of Allowability for U.S. Appl. No. 09/413,845, mailed Jul. 18, 2002.
Supplemental Notice of Allowability for U.S. Appl. No. 09/413,845, mailed Sep. 19, 2001.
Supplemental Notice of Allowability for U.S. Appl. No. 09/413,845, mailed Oct. 6, 2003.
Supplemental Notice of Allowability for U.S. Appl. No. 09/413,845, mailed Nov. 30, 2004.
Supplemental Notice of Allowability for U.S. Appl. No. 09/414,261, mailed Jan. 29, 2004.
Supplemental Notice of Allowability for U.S. Appl. No. 09/414,261, mailed Nov. 5, 2003.
User's Guide for the LOGOS ES1 by Logotronix, Boulder, Colorado (no date available).

* cited by examiner

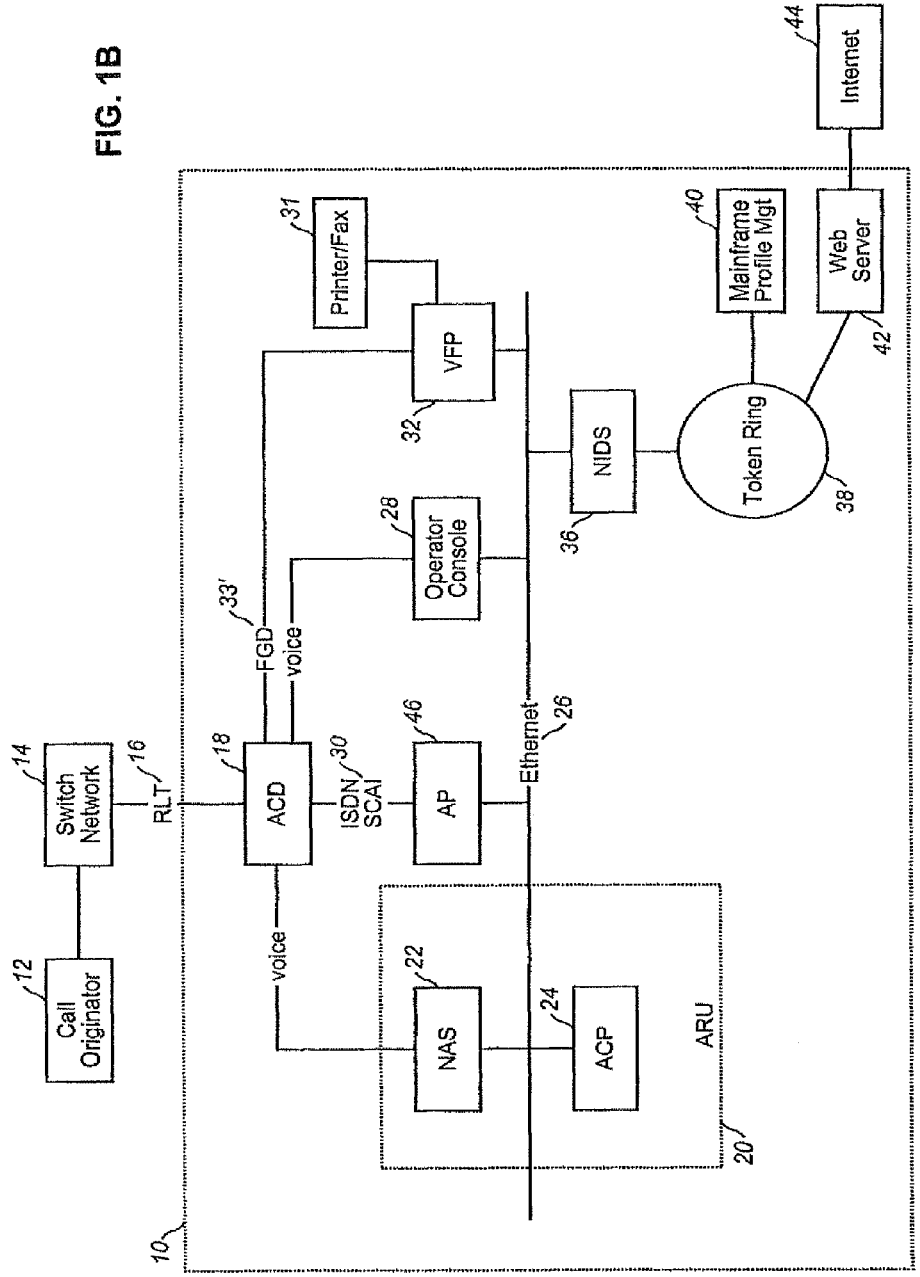

SINGLE TELEPHONE NUMBER ACCESS TO MULTIPLE COMMUNICATIONS SERVICES

CROSS-REFERENCE OF RELATED APPLICATIONS

This application is a continuation of U.S. application Ser. No. 10/423,203, filed Apr. 25, 2003, which is a divisional of U.S. application Ser. No. 09/413,846, filed Oct. 7, 1999 (now U.S. Pat. No. 6,795,532), which is a divisional of U.S. patent application Ser. No. 08/925,447, filed Sep. 8, 1997 (now abandoned). The entire contents of which are incorporated herein by reference.

TECHNICAL FIELD

The present invention relates generally to telecommunications systems and more particularly to providing single telephone number access to multiple communications services.

BACKGROUND OF THE INVENTION

In conventional telecommunications systems, a number of different telecommunications services are offered to subscribers. Each telecommunications service requires a unique telephone number. Examples of telecommunications services that require a unique telephone number are automatic routing services, voicemail services, facsimile services, paging services, cellular phone services and personal 800 numbers. One of the drawbacks of each service requiring a different telephone number is that managing and publishing multiple telephone numbers for a subscriber that uses multiple communications services can prove to be quite cumbersome. For example, a subscriber may have to provide a first telephone number for facsimile services, a second telephone number for voicemail services, and a third telephone number for cellular services. Thus, a subscriber must remember all of the unique telephone numbers and must make clear to people whom the subscriber gives the telephone numbers what services are associated with what telephone numbers. Oftentimes, a party confuses the mapping of telephone numbers to services and reaches the wrong service when dialing the telephone number that was given to the party. For instance, a caller may dial a number thinking that he will reach a person and instead the caller reaches a facsimile machine.

Another drawback of conventional systems is the lack of flexibility regarding the telecommunications services that are provided to subscribers. A subscriber may need to provide access to different services to different people at various times. For example, a subscriber may need to have phone calls directed to the subscriber's workplace during the work week but may need to have phone calls directed to his home or cellular phone on weekends. The subscriber may also wish to limit the people that may reach the subscriber by phone on the weekends. Still further, the subscriber may wish to provide other people with access to his voicemail. Unfortunately, with conventional systems such configurability of telecommunications services is not available.

SUMMARY OF THE INVENTION

The present invention provides a service node or platform for providing multiple communications services on behalf of a party known as a subscriber. The platform may be implemented using a computer system such as a server system that has an interface for interfacing with a telephone network. The platform may provide service for multiple subscribers. Each subscriber may have a single phone number through which access to all of the services that are provided by the platform may be realized.

The platform may provide a variety of different telecommunications services. For example, the platform may provide voicemail messaging services, facsimile messaging services, electronic mail messaging services, paging services, call routing services, and other types of services. Thus, the single platform may receive voicemail messages, electronic mail messages, pages, facsimile messages, and phone calls for the subscriber. The services that are available to respective subscribers may be configurable such that different subscribers have different services. The billing associated with using these services may also be configurable to be billed to a single account, a corporate account or to separate accounts.

The platform is readily configurable. The subscriber may select an override option that dictates how all calls will be processed. For example, a subscriber may configure the platform so that all calls are forwarded to a given destination, a messaging option or that a page is sent to the subscriber. The subscriber may also choose the different service options that are available to different callers. The callers may have to enter identification information and based upon the identification information, different service options are made available to the callers.

The platform may include speech recognition capabilities. These speech recognition capabilities may allow written messages to be converted into audio output and for audio messages to be converted into text or representations or other forms of written output. The written output may be directed to a printer, a facsimile, a computer system or other suitable output destination.

The platform may advise the subscriber of events via a pager. These events may be, for example, incoming calls. Pages may be sent that identify the incoming calls and the phone numbers to which the incoming calls are destined. Such pages may be resultant in a scrolling display that lists the respective calls and the respective phone numbers.

The platform may provide audio messages that advise a subscriber of events. These events may include a receipt of different types of messages and receipt of pages. The audio response may be generated and output to the subscriber while the subscriber is on a call. The audio output may be at a volume that is substantially lower than typical speaking volume so as to advise the subscriber of the event but without significantly interrupting the call of the subscriber.

The platform is able to combine messages of different types. For example, e-mail attachments may be made to facsimile messages. The resulting combination of facsimile message and e-mail message may be sent to a destination specified by the subscriber.

BRIEF DESCRIPTION OF THE DRAWINGS

A preferred embodiment of the present invention will be described in more detail below relative to the following figures.

FIG. 1B is a block diagram that shows a second system configuration that is suitable for practicing the preferred embodiment of the present invention.

DETAILED DESCRIPTION OF THE INVENTION

I. Overview

Figure 1A:
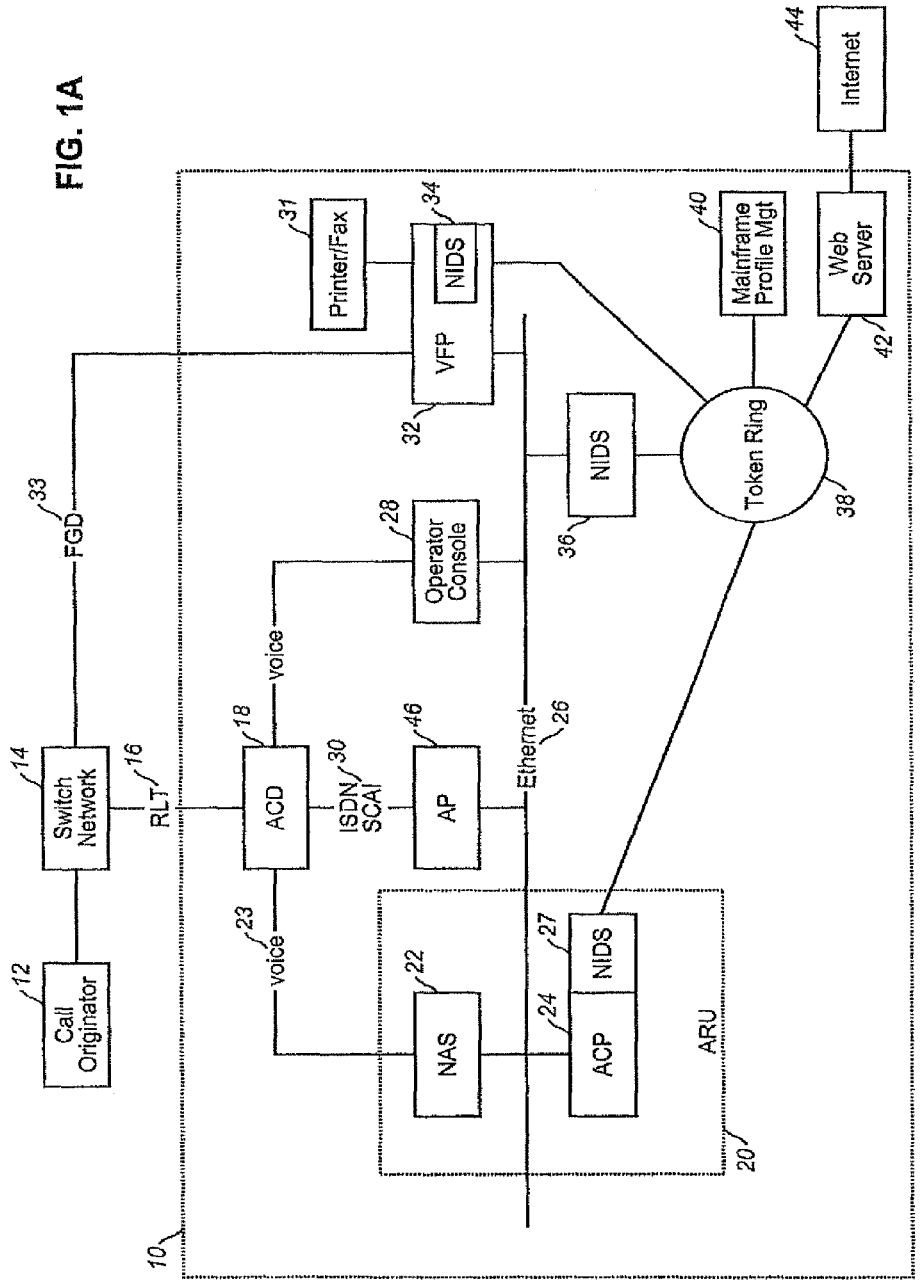
FIG. 1A is a block diagram that shows a first system configuration that is suitable for practicing the preferred embodiment of the present invention.

The preferred embodiment of the present invention provides a platform for enabling multiple telecommunications services to be accessible through a single telephone number. Thus, for example, access to paging services, facsimile services, routing services, voicemail services, calling card services, conference call services and 800 services, may be reached through a single telephone number with or without personal identification numbers (PINs). The subscriber has complete control over access to these services. In particular, the subscriber may specify what services are available to what people at what time. Hence, a first subset of the services to which the subscriber subscribes may be available to a first party at a first time and a second subset of services may be available to a second party at a second time. Moreover, a single party may have access to different subsets of the services depending on what time it is. The platform of the preferred embodiment of the present invention also provides the subscriber with the ability to place multiple calls from any location using the same telephone number and billing all the calls to a single account.

In the preferred embodiment of the present invention, the subscriber is assigned a single telephone number, such as a toll free 800 number, private network number, toll number or 888 number. This single telephone number may be used by other parties ("guests") to reach the subscriber at any destination telephone number programmed by the subscriber. In addition, the single phone number may be used to send a fax to the subscriber, to leave a voicemail message for the subscriber, or to page the subscriber. The subscriber may also program routing so that a call placed to the single telephone number of the subscriber reaches the subscriber at multiple locations. Also, as mentioned above, different callers may reach different services. As an example, calls from certain callers may automatically cause a page to be issued or automatically placed into voicemail.

The subscriber may access his account by calling the single telephone number that is assigned to the subscriber. Multiple outbound calls to domestic destinations or international destinations may be billed to a single account. Alternatively, calls from multiple subscribers may be billed to a single corporate account. Other billing options are also available. As a result, a subscriber need not enter a calling card number multiple times when placing multiple calls. A subscriber may also access their account to make updates to a service profile that is maintained. As an example, the subscriber may change the terminating telephone numbers that are used to reach the subscriber. Similarly, a subscriber may change which callers are sent to voicemail and which callers automatically cause a page to be sent.

In one embodiment of the present invention, a subscriber is assigned multiple PINs. Each PIN is a short sequence of numeric characters or DTMF tones. Each PIN is associated with a different service configuration. One of the PINs is assigned solely for use by the subscriber, and when the subscriber calls his assigned telephone number and enters his PIN, the platform knows that it is the subscriber who is calling and offers subscriber only services. The other PINs may be assigned to different service profiles. These PINs may be distributed to appropriate parties to specify what services would be available to those parties. For example, a first PIN may be given to family members of a subscriber, whereas a second PIN may be given to business associates of the subscriber. As a result, family members will have access to a first set of services and business associates will have access to a second set of services. PINs may also be used to distinguish between subscribers such that each subscriber has a unique associated PIN or PINs.

II. Platform Architecture

FIG. 1A is a block diagram that illustrates a first system architecture for practicing the preferred embodiment of the present invention, where the system architecture is part of a larger telecommunications network. The system includes a platform 10 that encompasses multiple components. The platform 10 provides single telephone number access to multiple telecommunications services for a subscriber. The subscriber, in this context, is the customer to whom the single telephone number is assigned. The single telephone number may be accessed by both the subscriber and callers to the subscriber (i.e., guests). The platform 10 includes an automated call distributor (ACD) for performing access and switching functions. The ACD 18 routes incoming calls to the appropriate components within the platform for properly handling the calls. The ACD 18 is a conventional digital matrix switch that includes programs for performing call queuing and distribution. A suitable ACD is the Northern Telecom DMS-100. Those skilled in the art will appreciate that a number of different types of switching mechanisms may be used, including those that support call conferencing.

The platform 10 also includes an application processor (AP) 46 that is associated with the ACD 18. The AP may be a dedicated computer system that provides intelligent application processing for the ACD 18. Certain functionality that may be performed by the ACD 18 is off-loaded to the AP 46 to enable the ACD to focus on performing the switching and queuing functionality. The AP 46 is linked to the ACD 18 via an ISDN implementation of a switch/computer application interface (SCAI) link 30.

The platform 10 includes an automated response unit (ARU) 20 that provides voice response and menu routing functions to a caller. The ARU 20 facilitates caller input via selection of dual-tone multi-frequency (DTMF) digits, such as by pressing keys on a telephone keypad. The ARU 20 may provide various automated menus which the caller may navigate to reach a desired service. The ARU 20 includes a network audio server 22, which is a server computer that has a voice telephony interface to the ACD 18. The NAS 22 is linked to the ACD via multiple voice trunks 23 and, in general, provides an audio interface to a caller. The ARU 20 also includes an automated call processor (ACP) 24. The ACP 20 provides intelligent call processing functions for the ARU 20. The ARU 20 is responsible for handling all initial inbound calls for the platform 10. The NAS 22 and ACP 24 may be linked, for example, by an Ethernet.RTM. local area network (LAN) 26 (Ethernet is a trademark of Xerox Corporation). The ACP 24 operates by executing scripts that take callers through a series of menus, accept caller input, make decisions based upon caller input, and perform actions such as the transfer of a call to another destination to provide appropriate services. The ACP 24 prompts the AP 46 or NAS 22 to play prompts to callers, to gather DTMF digit input, to play various recorded messages. The ACP 24 may be implemented on a high-grade mid-range computer, such as the IBM RS/6000 from International Business Machines Corporation, or an Alpha-based computer from Digital Equipment Corporation (DEC).

As will be described in more detail below, the scripts executed by the ACP 24 determine which communications services to provide to a caller, and then the ACP 24 provides those services by commanding the NAS 22 to transfer the call to the appropriate service provider. The scripts executed by the ACP 24 are customized to a subscriber by using a subscriber profile as input data. The subscriber profile is stored for use by the platform, as will also be described in more detail below. The subscriber profile specifies which services are available to a subscriber and guests and which destination numbers are to be used.

The platform 10 may include one or more operator consoles 28. These consoles 28 are specialized workstations that are operated by human operators. Those skilled in the art will appreciate that automated attendants may be used instead of human operators. The operator consoles 28 may perform much of the same functionality as is performed by the ARU 20. In particular, the human operator at each operator console 28 may perform the appropriate scripts, prompting and transferring needed for call processing.

The platform 10 may have a voicemail/faxmail platform (VFP) 32. This platform collects, stores, and manages both voicemail messages and facsimile messages. It collects voicemail and facsimile messages over Feature Group D (FGD) trunks 33 from a telephone switching network 14. Calls that require voicemail or facsimile services are transferred to the VFP 32 from the ARU 20, as will be described in more detail below. A transfer occurs with the assistance of the ACD 18 and the switching network 14. The VFP 32 may be coupled to a printer and/or facsimile machine.

The platform 10 may include multiple network implementation distribution servers (NIDS) 27, 34 and 36. Each of these NIDS may be implemented as a separate computer system. The NIDS may be redundant, and generally serve the role of storing database information, including subscriber profiles. The NIDS 27, 34 and 36 may all be connected to the Ethernet LAN 26 in the system configuration depicted in FIG. 1A, an NIDS 27 is shown as part of the ARU 20 so that the ACP 24 can directly access subscriber profiles without having to go over the Ethernet LAN 26. In general, the ACP submits database queries to the NIDS 27 to obtain data on the subscriber profile. The subscriber profile is used to determine what scripts to play for a caller, to determine what communications services can be offered to a caller, and to determine what destination telephone numbers and mailbox identifiers to use. The VFP 32 submits queries to the NIDS 34 for billing information.

The NIDS 27, 34 and 36 are also interconnected via a token ring local area network (LAN) 38. This LAN 38 is used for updates that are made to subscriber profiles and to keep the databases stored on the various NIDS consistent with a centralized profile database that is maintained by the mainframe profile management system 40 (which is on a dedicated mainframe or other suitable computer system). When a modification or update is made at one NIDS 27, 34 or 36, the affected NIDS sends a message to the mainframe profile management system 40, which makes the update to the centralized profile database and then ensures that each of the profile databases on the other NIDS are updated.

The platform 10 may also include a web server 42 that is connected to the token ring LAN 38 to provide a web site that a subscriber may access over the Internet 44. The web page at the web server 42 enables a subscriber to update the subscriber profile for the subscriber over the Internet. These updates may be forwarded to the mainframe profile management system 40, which in turn may update the information stored at the NIDS 27, 34 and 36. Alternatively, an NIDS may be resident with the web server such that the NIDS associated with the web server updates the profile information and passes the update on to the mainframe profile management system 40. Those skilled in the art will appreciate that the web server 42 may also be part of an Intranet rather than the Internet. Still further, those skilled in the art will appreciate that the web server 42 may more generally be a program that provides a user interface to subscribers so that the subscribers may update service profile information via computer. Hence, a program may be a program resident on a server that is part of a distributed system such as a LAN or wide area network (WAN).

The web server 42 is described in more detail in co-pending application entitled, "System for Internet-Based Profile Management in a Single Number Communications Server," which was filed on even date herewith and is assigned to a common assignee with the present application and which is explicitly incorporated by reference herein.

The call originator 12 depicted in FIG. 1A represents the origination of a call to the platform 10. This call may be from a subscriber or a caller that is seeking to reach the telephone number that is assigned to a subscriber. Moreover, the call may originate from a facsimile machine or a computer. The call reaches the switch network 14 of the service provider in any of a number of different ways, including local exchange carrier, private line, dedicated access line, or international carrier. The switch network 14 routes the call to the ACD 18 within the platform 10 via a release link trunk (RLT) 16. The RLT 16 is a voice trunk that may be released from a call when the call is extended back to the switch network 14 by the ACD 18. The processing of the call within the platform 10 will be described in more detail below.

FIG. 1B shows a second system configuration that is suitable for practicing the preferred embodiment to the present invention. This second configuration differs from the first configuration in several respects. First, there is no NIDS within the ARU and no NIDS associated with the VFP. In this second system configuration, database queries from the ACP 24 in the VFP 32 are passed over the Ethernet LAN 26 to the NIDS 36. Second, the VFP 32 is extended directly to the ACD 18 via FGD trunks 33. As a result, call transfers from the ARU 20 to the VFP 32 may be performed by the ACD within the platform 10. There is no need for transferring the call outside of the platform.

Those skilled in the art will appreciate that the system configuration shown in FIGS. 1A and 1B are intended to be merely illustrative. For example, multiple platforms may be implemented within a given telecommunications system. Furthermore, multiple operator consoles 28 may be provided within the platform 10 and multiple ACDs may be provided. Each ACD may have its own associated AP. Still further, multiple ARUs may be provided within a given platform and multiple ACDs may be combined with a single VFP. Still further, the components may be connected by different types of LANs or interconnections that differ from those shown in FIGS. 1A and 1B.

Figure 2:
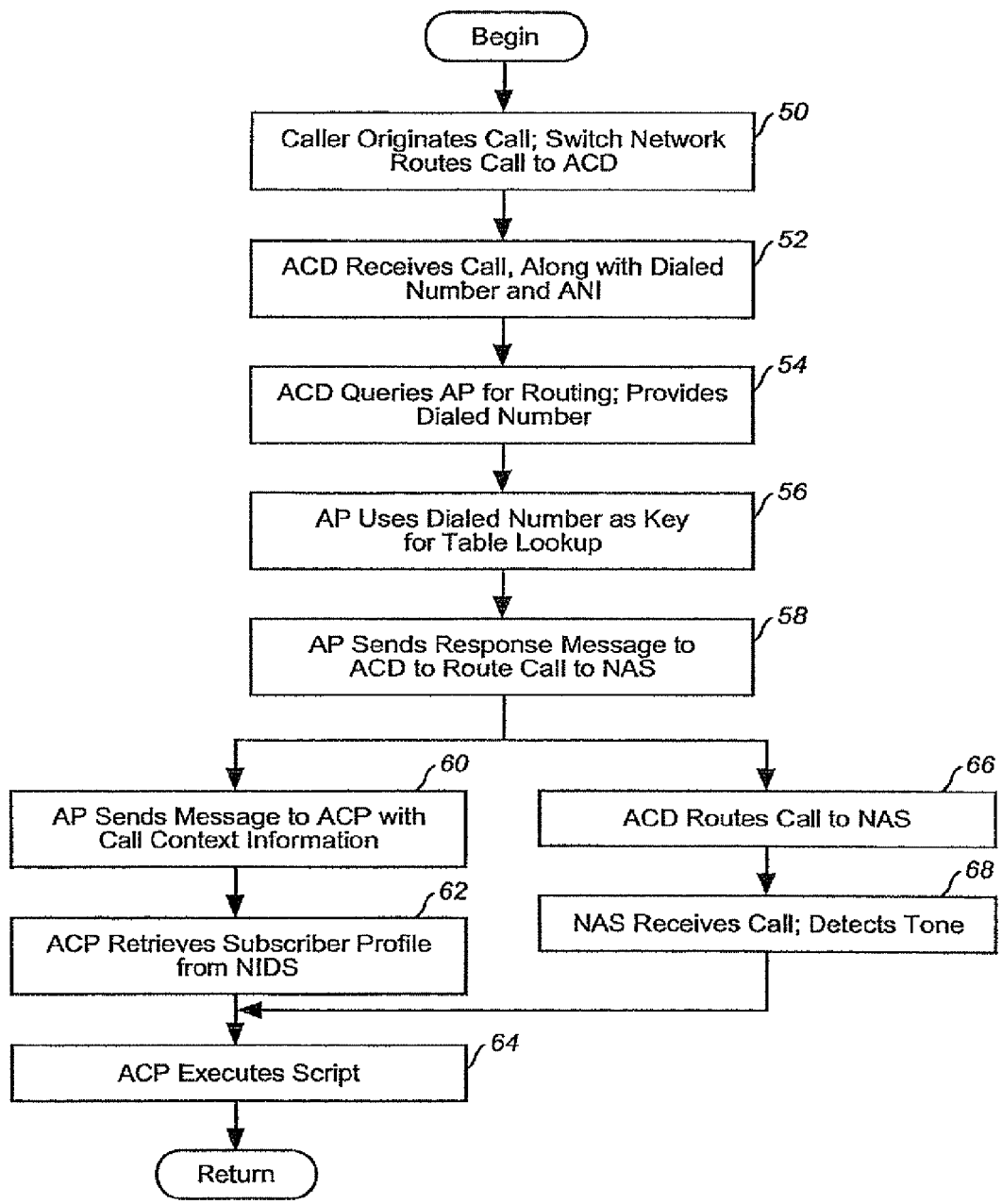
FIG. 2 is a flowchart that provides an overview of the steps that are performed when a caller initiates a call to the platform of the preferred embodiment of the present invention.

FIG. 2 provides an overview of the steps that are performed when a call is placed to a phone number that is assigned to a subscriber. Initially, the call originator 12 places a call to the phone number that is assigned to a subscriber, and this call is switched via the switch network 14 to the ACD 18 within the platform 10 (step 50 in FIG. 2). The ACD 18 receives the call along with information regarding the dialed phone number and automatic number identifier (ANI) of the caller (step 52 in FIG. 2). The ANI is a value that uniquely identifies the calling phone number. The ACD 18 then queries the AP 46 with the subscriber telephone number to obtain routing directions. The AP 46 uses the subscriber telephone number as a key to a look-up table to determine where to route the call (step 56 in FIG. 2). Given that the telephone number is a specially designated telephone number for providing multiple telecommunications services through a single number, the AP sends a response message to the ACD 18 that instructs the ACD to route the call to the NAS 22 of the ARU 20 (step 58 in FIG. 2). In addition, the AP 46 sends a message to the ACP 24 of the ARU 20 that includes call context information (step 60 in FIG. 2). The call context information may include the subscriber phone number, ANI, PIN, and other information. When a PIN is used, the ARU may prompt the user to provide the caller with the PIN when the ARU initially receives the call. The ACP 24 uses this call context information to retrieve a subscriber profile from the NIDS 27 (FIG. 1A) to determine what script to execute (step 62 in FIG. 2). The profiles are described in more detail below.

The call is routed from the ACD 18 to the NAS 22 (step 66 in FIG. 2). The NAS 22 receives the call and detects the tone of the call to determine whether the call is a facsimile call or not (step 68 in FIG. 2). The NAS 22 has the ability to detect a fax tone and notifies the ACP 24 if such a fax tone is detected. The detector of the fax tones involves listening for a sequence of tones over a fixed time period. These tones match those produced by a facsimile machine. If such tones are heard, a fax tone is detected. The ACP 24 may then execute a script to transfer the call to an appropriate fax destination. The ACP 24 executes a script for properly processing the incoming call (step 64 in FIG. 2). These scripts are discussed in more detail below.

Figure 3:
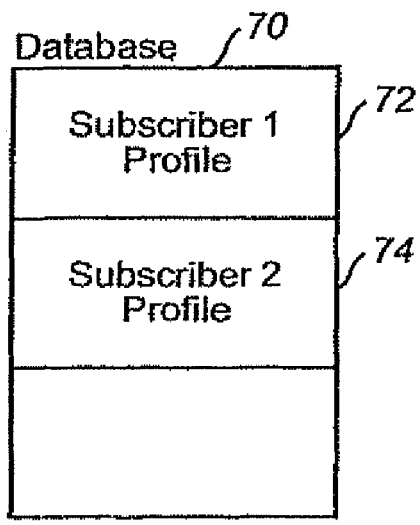
FIG. 3 is a diagram that illustrates the format of a database that holds subscriber profiles.

The database stored on the NIDS 27, 34 and 36, and the mainframe profile management system 40 may hold multiple subscriber profiles. FIG. 3 depicts an example where the database 70 holds a first subscriber profile 72 for subscriber 1 and a second subscriber profile 74 for subscriber 2. Each subscriber profile holds information like that shown in FIG. 4. Each subscriber profile 82 includes an identifier 84 that uniquely identifies the profile. The profile also holds information 86 that identifies which services are available to the subscriber and guests. As mentioned above, different categories of guests may have different sets of services available and these sets are set forth in the subscriber profile in the services available section 86. The services available to a guest may include, for example, voicemail services, facsimile services, paging services and direct telephone contact with a subscriber. The information regarding the services that are available may be, for instance, stored as flags that specify whether the services are available or not to this category of guest. Moreover, conditional information such as time constraint information may be stored to specify when the services are or are not available to the category of guest. The services available to a user may include the ability to send or retrieve voicemail, the ability to place a call and gain access to a number of different information services.

The subscriber profile 82 may also hold status information 88 regarding the respective services. The profile may also hold service-specific information 90. The information 90 may include information such as forwarding phone numbers to be used in routing phone calls, telephone numbers to be used in paging, the type of facsimile messaging to facilitate, and so forth.

Figure 4:
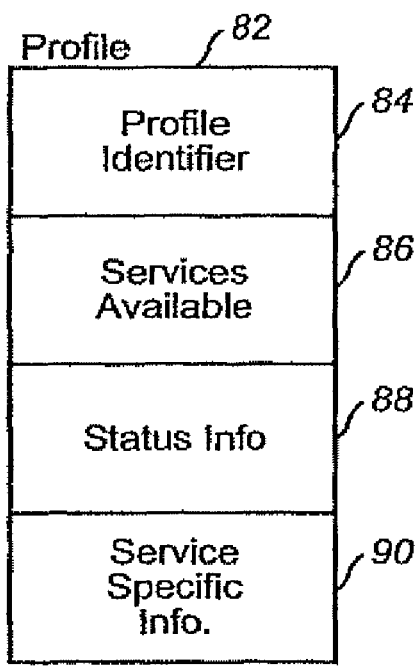
FIG. 4 is a diagram that illustrates the logical content held within a subscriber profile.

Those skilled in the art will appreciate that the depiction of the database in FIGS. 3 and 4 is intended to be merely illustrative and not limiting of the present invention. The database may be differently configured and the information may be contained across multiple databases in alternative implementations.

The profile retrieved from the database will designate whether the caller is a guest or a subscriber. The profile will also specify the services that are available to the guest or subscriber. The discussion below will focus initially on instances where a guest calls into the platform 10 and then later on instances where a subscriber calls into the platform 10.

III. Services

A. Overview

As was discussed above, the ACP 24 executes a script depending upon the retrieved subscriber profile. If the phone call is from a computer of facsimile machine, the call is extended to the VFP 32. Otherwise, the ACP 24 executes a script that causes a menu of options to be output to the user in the form of recorded audio messages. In particular, the ACP 24 commands the NAS 22 to play certain audio messages. The menu may be customized for guests or subscribers. For instance, the menu may be recorded by the subscriber or the subscriber may choose among pre-recorded menus that were recorded by different parties. The initial guest menu may, for example, take the form of an audio recording that asks the caller "How may I help you reach your party?" and then itemizes a number of options. The options that are itemized depends upon the services that are available based upon a retrieved profile for the subscriber. The ordering of the options may be customizable by the subscriber. These options may include:

1. Speak to party.
2. Leave a voicemail.
3. Send a fax.
4. Send a page.

The caller responds to the guest menu. The caller may provide a voice response, DTMF response or tonal response. The platform may support one or more of such response options. For illustrative purposes, the discussion below will assume that the caller responds by depressing a key on a touch-type keypad. Thus, if the caller wishes to leave a voicemail, the caller presses the "2" key. The ACP 24 responds to the user input to transfer the call to the appropriate destination for enabling the caller to be serviced. If the caller chooses to leave a voicemail or send a fax, the call is transferred to the VFP 32. The other services are handled by the ACP 24.

B. Routing

Figure 5:
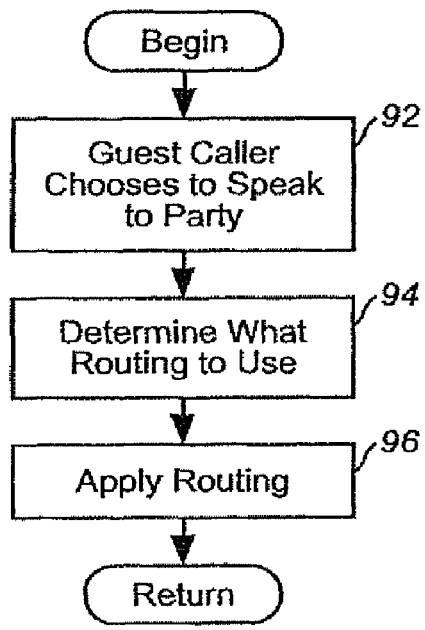
FIG. 5 is a flowchart illustrating the steps that are performed when a guest caller chooses to speak with a subscriber party.

Suppose that the caller chooses the option of being connected to the subscriber (e.g., the first option in the guest menu set forth above). FIG. 5 is a flowchart that illustrates the steps that are performed in such an instance. Initially the guest caller chooses to speak to the subscribing party (step 92 in FIG. 5). The ARU 20 then determines what routing is to be applied based upon routing options chosen by the subscriber (step 94 in FIG. 5). The appropriate routing is then applied (step 96 in FIG. 5). The routing may include Findme routing and scheduled routing.

Figure 6A:
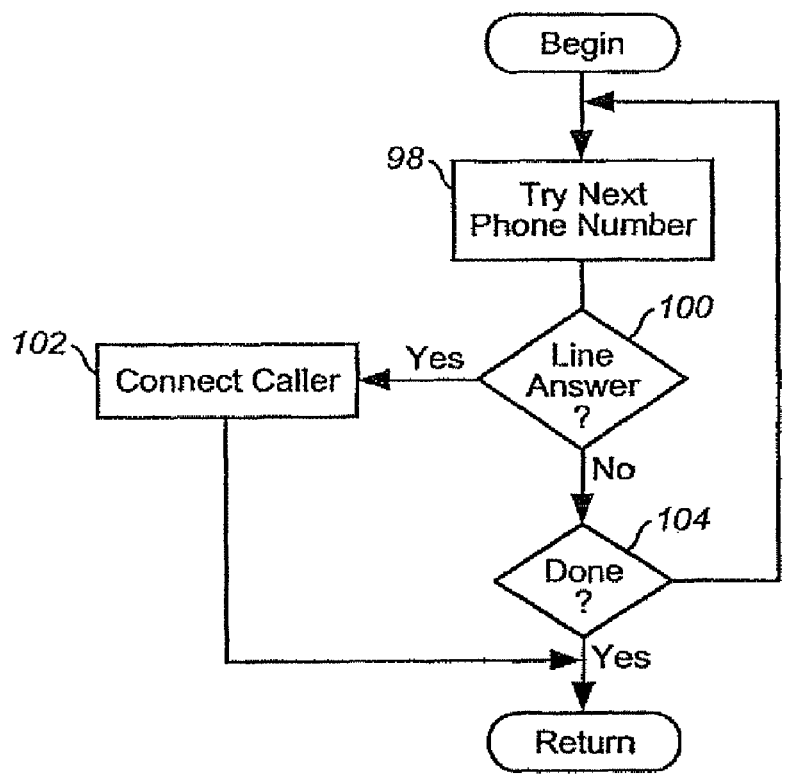
FIG. 6A is a flowchart illustrating the steps that are performed in Findme routing.

With Findme routing, a subscriber may specify multiple terminating telephone numbers that the platform 10 can call to reach the subscriber. For example, the subscriber may specify up to three phone numbers that are attempted in sequence. A subscriber might specify his office number first, his cellular number second and his home number third. When such Findme routing is applied, the ARU 20 places the caller on hold while it places calls to these numbers in sequence. FIG. 6A is a flowchart illustrating the steps that are performed in such an instance. The ARU 20 tries the next phone number in the find me sequence (step 98 is FIG. 6A). The ARU then determines whether it gets a live answer or not (i.e., whether a person answers the 5 phone call) (step 100 in FIG. 6A). If the call results in a ring no answer (RNA) after a specified number of rings, or if the call is picked up by an answering machine, the call is terminated, and the ARU attempts to place a call to the next number in the sequence (see step 98 in FIG. 6A) provided that all of the numbers have not been exhausted (see step 164). When all numbers have been exhausted, the caller may be asked to call again, leave a voice message, or choose between leaving voicemail or paging.

The ARU 20 includes a digital signal processor (DSP) to detect the inflection of a voice answering the call to distinguish a live person answering the call from an answering machine answering the call. If all of the phone numbers are exhausted, the ARU may stop Findme routing and apply alternate routing treatment, such as routing the call to the subscriber's voicemail, issuing a page to the subscriber, presenting a closing message recorded by the subscriber, or presenting the caller with an option of any combination of the above described choices. If, however, a live answer is realized (see step 100), the ARU connects the caller to complete the call (step 102 in FIG. 6A).

Figure 6B:
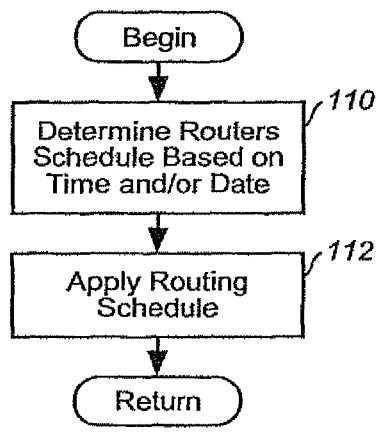
FIG. 6B is a flowchart illustrating the steps that are performed in scheduled routing.

FIG. 6B is a flowchart illustrating the steps that are performed when scheduled routing is utilized. Followme routing is a feature where a subscriber may specify one or more routing schedules that may each include one or more terminating numbers to reach the subscriber. Which routing schedule is applied is based upon date, day, and/or time (step 110 in FIG. 6B). The given routing schedule is then applied (step 112 in FIG. 6B). A couple of examples are helpful to illustrate operation of scheduled routing. A subscriber may specify two numbers to be tried in sequence (such as his office telephone number and cellular telephone number), during working hours on weekdays. The subscriber may, on the other hand, specify two other phone numbers, corresponding to his home telephone number and his voicemail message box, during weekends and non-working hours during the weekdays. The telephone numbers that are specified may, alternatively, refer to PCS devices. Similarly, a subscriber may specify that one telephone number is to be called first during certain days and hours of the week and that another telephone number is to be called first during all other days and hours. Alternate routing treatment may be applied if no live answer is obtained, as was discussed above relative to Findme routing.

The routing options are described in more detail in co-pending application entitled, "Multiple Routing Options on a Telecommunications Platform," which was filed on even date herewith and is assigned to a common assignee with the present application and which is explicitly incorporated by reference herein.

C. Paging

Figure 7:
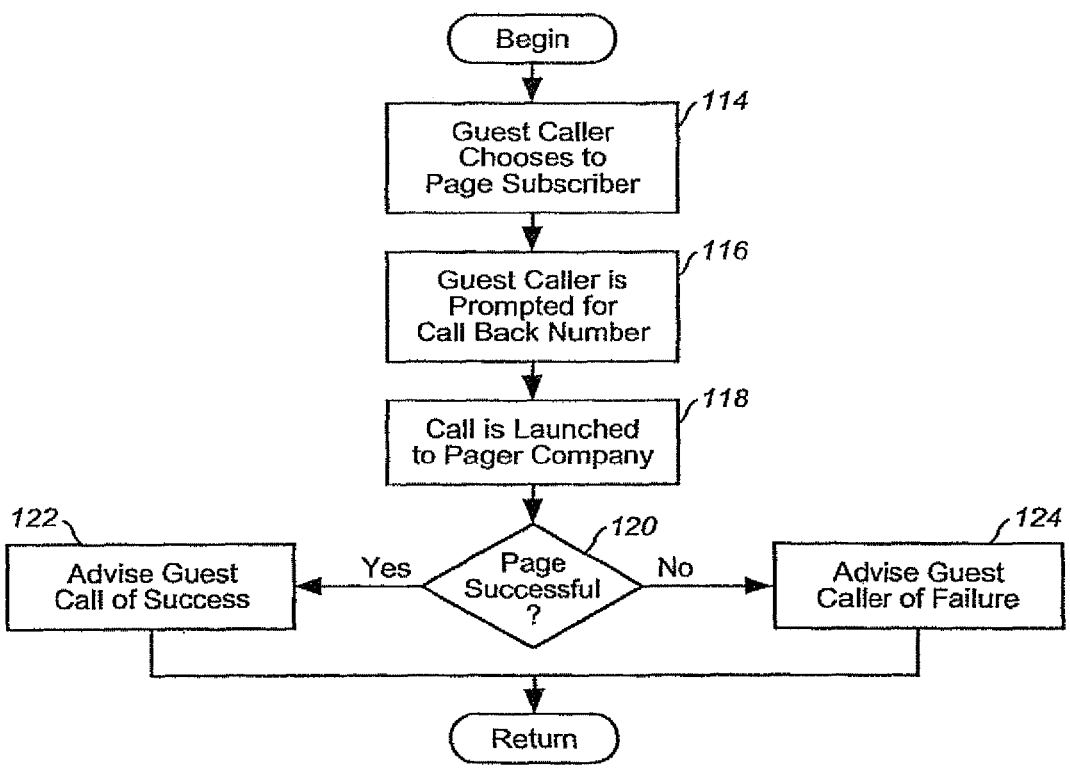
FIG. 7 is a flowchart illustrating the steps that are performed when a guest caller chooses to place a page to the subscriber.

A guest caller may also choose to page a subscriber (step 114 in FIG. 7). In such an instance, the ARU 20 prompts the guest caller for a callback number (step 116 in FIG. 7). In particular, the ACP 24 plays a recorded audio message for the caller such as "please enter your callback number followed by a #." The guest caller responds by entering the DTMF digits via the guest caller's phone set. These digits are collected by NAS 22 and recorded by ACP 24. The ACP 24 queries the subscriber profile for the subscriber to obtain the pager access number, the subscriber's PIN, and pager type. The call is then launched to the pager company (step 118 in FIG. 7) by the ACP 24 instructing the ACD 18 to place an outbound call using the pager access number retrieved from the subscriber's profile and to use the dial string provided by the pager type and to use the subscriber's PIN. This process may entail a handoff to an operator to facilitate alphanumeric paging. The NAS 22 places the call which is routed by the ACD 18 over the switch network 14 to the subscriber's pager company network. When the call is connected, the NAS outpulses the dial string and enters the subscriber's PIN when prompted. The NAS provides the numeric callback number that was entered by the caller and recorded by the ACP 24 when prompted. If the page is successful, the guest caller is so advised of the success (step 122 in FIG. 7). The guest caller is also informed when the page is not successful (step 124 in FIG. 7). The paging may include text paging which produces a textual page to the party being paged.

It should be appreciated that the paging may, alternatively, be initiated over the Internet. In particular, rather than using a traditional paging company to initiate the page, the present invention may initiate the page over the Internet via the web server 42.

D. Voicemail

Figure 8:
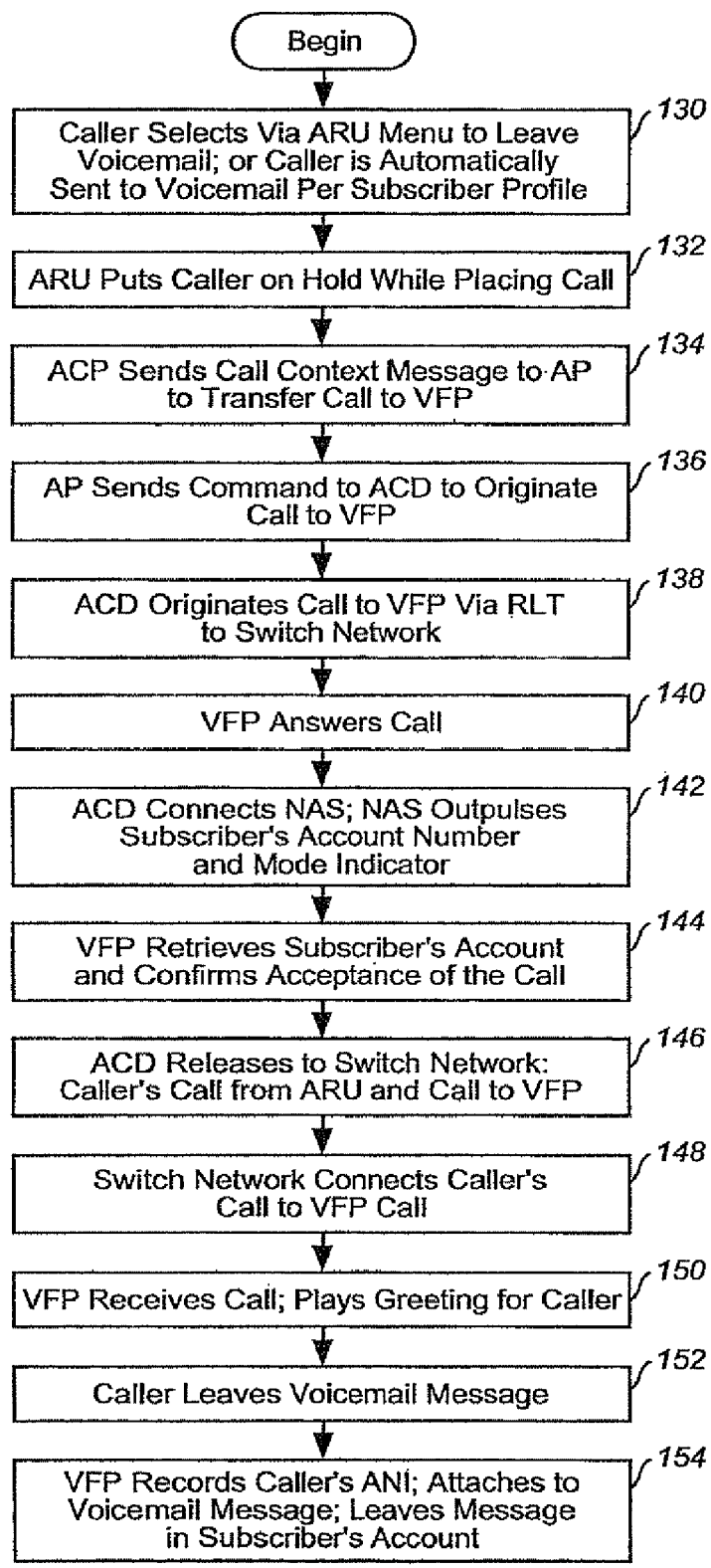
FIG. 8 provides a flowchart of the steps that are performed when a guest caller chooses to leave a voicemail message for a subscriber.

Another service that is available to a guest caller is voicemail for a subscriber's voicemail box. FIG. 8 shows the steps that are performed when a guest caller is transferred to voicemail for a subscriber. The process is initiated by either the caller selecting the voicemail option from the guest menu or the subscriber configuring the system so that the guest caller is automatically sent to voicemail per the subscriber's profile (step 130 in FIG. 8). The ARU 20 then puts the guest caller on hold while placing a call to the voicemail system (step 132 in FIG. 8). The ACP 24 sends a message to the AP to transfer the call to the voicemail system (step 134 in FIG. 8). The voicemail system may be an external voicemail system or that provided by the VFP 32. For purposes of the discussion below, it is assumed that the call is to be transferred to the VFP 32. The subscriber profile holds information regarding the phone number of the voicemail system.

The AP 46 then sends commands to the ACD 18 to originate a call to the VFP 32 (step 136 in FIG. 8). The ACD 18 originates the call to the VFP via the RLT 16 to the switch network 14 (step 138 in FIG. 8). The VFP 32 answers the call (step 140 in FIG. 8). The ACD 18 then connects with the NAS 22. The NAS 22 outpulses the call context information which includes a subscriber's number and a mode indicator. The mode indicator is a value that specifies what type of call is being transferred. Possible values for the mode indicators are as follows:

| Mode Indicator | Transfer Type |
| --- | --- |
| 1 | Guest caller leaving voicemail |
| 2 | Guest caller leaving fax with voice annotation |
| 3 | Guest caller leaving fax without voice annotation |
| 4 | Subscriber voicemail/faxmail retrieval |
| 5 | Subscriber list maintenance |
| 6 | Subscriber recording mailbox name |

In this case, mode indicator is a value of 1 indicating that guest caller is leaving a voicemail message (step 142 in FIG. 8).

The VFP 32 uses the call context information to retrieve the subscriber's account and confirm acceptance of the call (step 144 in FIG. 8). The VFP 32 uses the subscriber's telephone number to identify the account so that it may be retrieved. The account includes a subscriber's voicemail box. The ACD 18 then releases the connection to the switch network 14. Specifically, the ACD releases the caller's call from the ARU and the call to the VFP from the ACD (step 146 in FIG. 8). The switch network 14 then completes the call connection by connecting the guest caller's call to the VFP call (step 148 in FIG. 8).

The VFP 32 receives the call and plays a greeting for caller, which may either be a standard system greeting, a custom greeting prerecorded by the subscriber or other customized greeting chosen by the subscriber (step 150 in FIG. 8). The subscriber profile may specify which greeting to play. The guest caller then leaves a voicemail message (step 152 in FIG. 8). The VFP prompts the caller to enter a callback number and attaches the ANI (if entered) to the voicemail message. As a result, when the subscriber retrieves the voicemail message, the subscriber may place an outbound call to the caller using the ANI for a dialed number. This is exploited in the auto-callback feature described below. The VFP 32 also takes action (such as incrementing a counter) to identify the arrival of the voicemail message (step 154 in FIG. 8A). The VFP 32 may also, at the subscriber's option, play music while a caller is on hold.

After the guest caller has left a voicemail message, the VFP 32 prompts the guest caller with a number of options. These options may be played to the guest caller as prerecorded audio messages. These options may enable the guest caller to review the recorded message, to rerecord the message, to deliver the message, to cancel delivery of the message hang-up or return to the guest menu.

E. Faxmail

Figure 9:
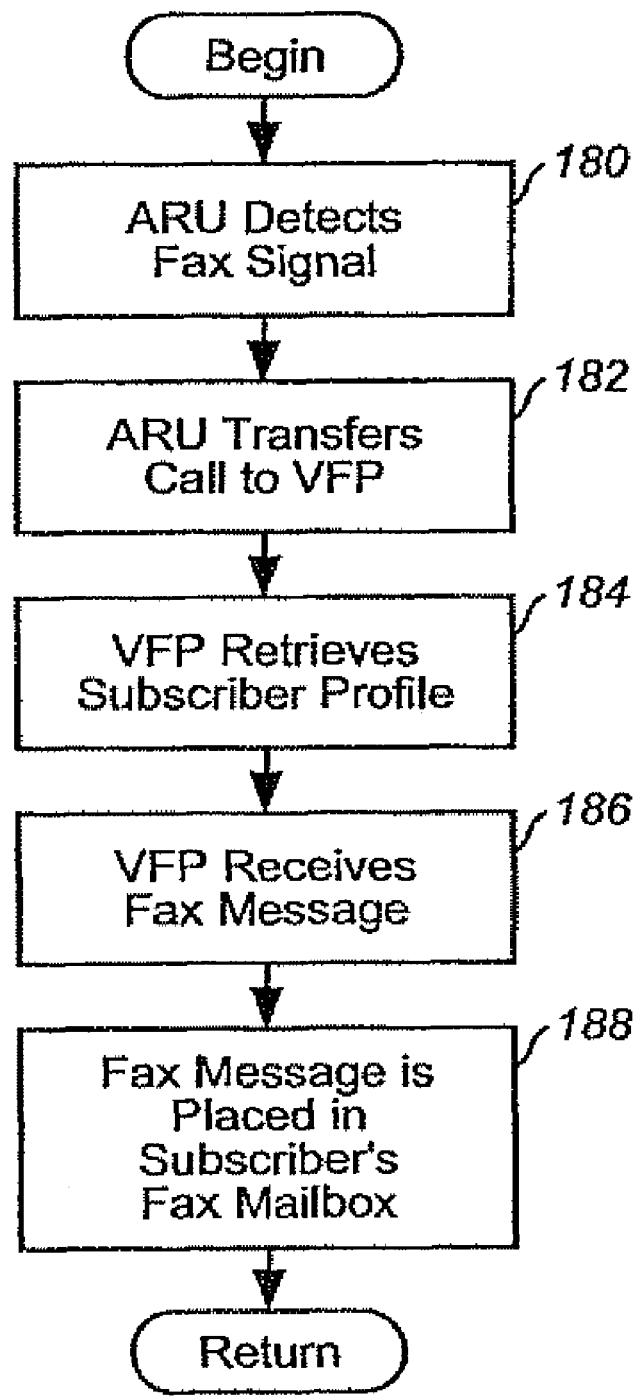
FIG. 9 is a flowchart illustrating the steps that are performed when a guest caller chooses to leave a facsimile message.

A guest caller may also transmit a facsimile message to a subscriber. FIG. 9 shows a flowchart of the steps that are performed in such an instance. The guest call is routed to the ARU 20 (as has been described above), and the ARU detects the presence of the fax signal (step 180 in FIG. 9). The ARU 20 transfers the call to the VFP 32. The VFP then retrieves the subscriber profile from the database (step 184 in FIG. 9). When the VFP accepts the call, the caller transmits the fax message and 5 the VFP receives the fax message (step 186 in FIG. 9). The received fax message is then placed in the fax mailbox of the subscriber in the subscriber's account (step 188 in FIG. 9).

Figure 10:
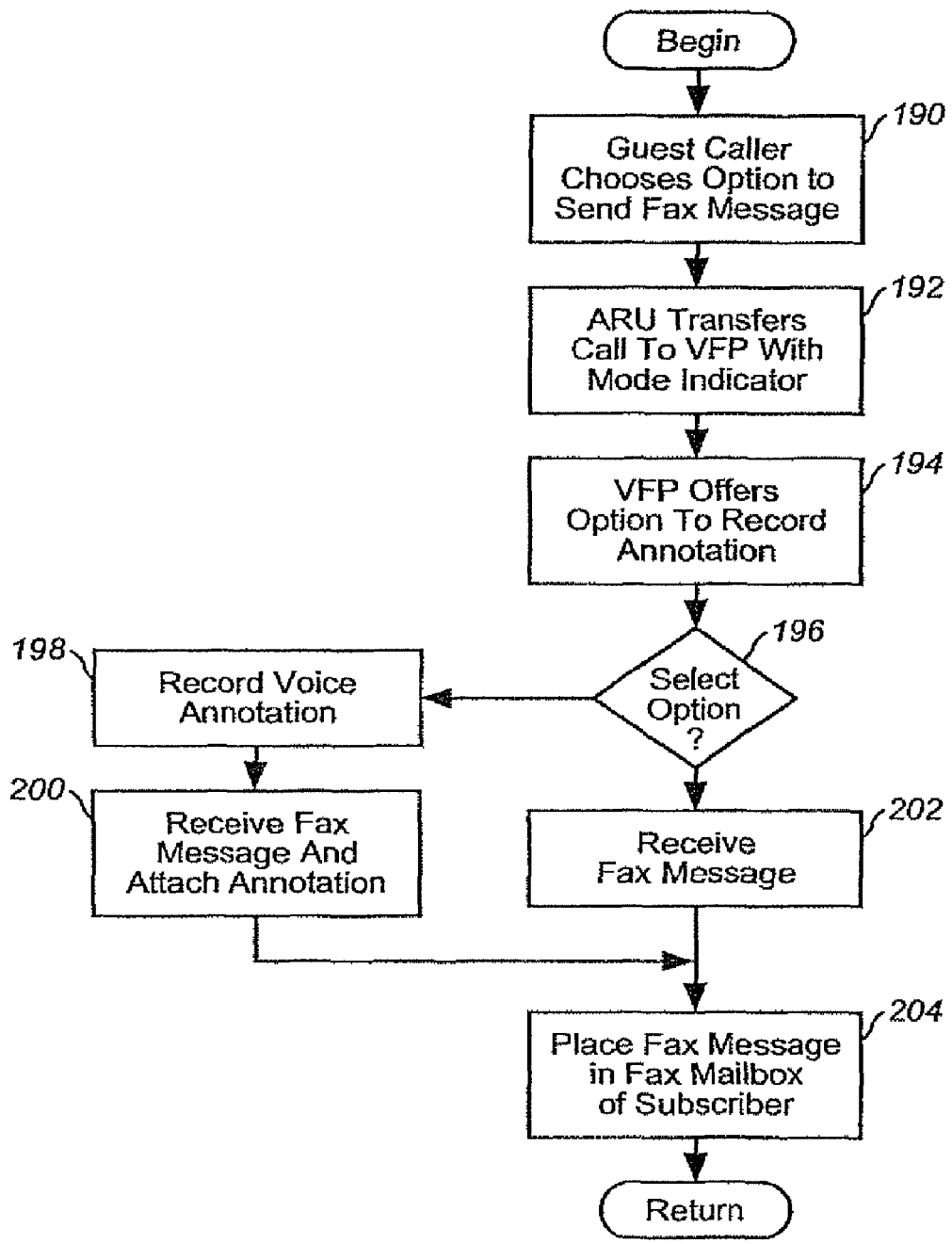
FIG. 10 is a flowchart illustrating the steps that are performed when a guest caller chooses to leave a facsimile message by selecting an option from the guest menu.

The guest may also initiate the fax process from the guest menu. In such an instance the guest caller chooses the option to send a facsimile message from the guest menu (step 190 in FIG. 10). The ARU 20 then transfers the call to the VFP 32 with a mode indicator. In this instance, the mode indicator has a value of 2 to specify that the guest caller is leaving a fax, possibly with a voice annotation (step 192 in FIG. 10). The VFP then offers the option to the guest caller to record a voice annotation (step 194 in FIG. 10). If the guest caller selects the option (see step 196 in FIG. 10), the voice annotation is recorded (step 198 in FIG. 10) and attached to the fax message (step 200 in FIG. 10). Otherwise, the fax message is received as has been described above (step 202 in FIG. 10). In both cases the fax message (with or without annotation) is put into the fax mailbox of the subscriber as has been described above (step 204 in FIG. 10).

F. Subscriber Services

When a subscriber calls into the platform 10, the user scripted with the guest menu enters his pass code and is presented with a different menu than guest callers. The subscriber main menu presents the subscriber with the following options:

1. Change call routing.
2. Send/receive mail.
3. Place a call.
4. Administration.
0. Customer Service.

This assumes that the subscriber has subscribed to all of these services. In cases where a subscriber subscribes to less than all of these services, fewer options may be presented.

1. Routing

When the subscriber chooses option 1 to change routing, the subscriber is prompted with a second menu that enables the subscriber to either change the Findme routing, the override routing, or alternate routing. The Findme routing has been described above. With respect to Findme routing, the user may change the three number telephone sequence and may change the schedules that are associated with the routing. Override routing refers to an instance when the subscriber desires to override the guest menu options for guest callers and prescribe a single treatment for callers. This may include sending calls to voicemail, prompting a page to the subscriber, utilizing Findme routing, and so forth. When the user selects the option for override routing, the user is able to configure what overrides are to be utilized. These overrides are part of the configurability of the service options discussed above.

2. Voicemail/Faxmail

Figure 13:
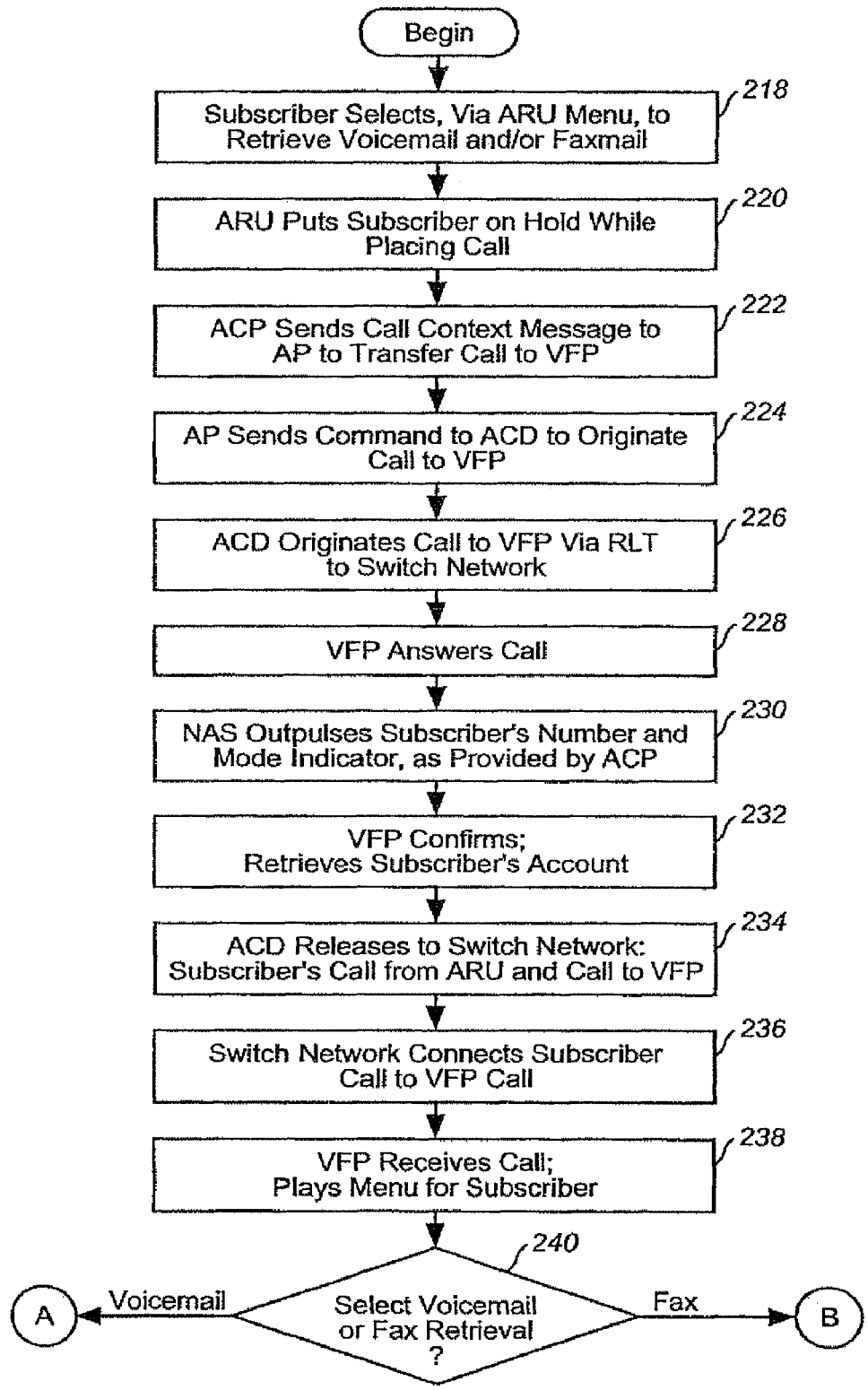
FIG. 13 is a flowchart illustrating the steps that are performed when a subscriber chooses to retrieve a voicemail message or a facsimile message.

The subscriber may choose to retrieve voicemail messages or fax messages. FIG. 13 is a flowchart illustrating the steps that are performed in such an instance where a subscriber chooses to retrieve voicemail and/or a fax message. Initially, the subscriber chooses the send/retrieve message option from the user menu that is presented by the ARU 20 (step 218 in FIG. 13). The ARU 20 then puts a subscriber on hold while a call to the VFP is being originated (step 220 in FIG. 13). The ACP 24 sends a call context message to the AP 46 to transfer the call to the VFP 32 (step 222 in FIG. 13). The AP sends a command to the ACD 18 to originate the call to the VFP 32 (step 224 in FIG. 13). The ACD 18 then originates the call to the VFP 32 via RLT 16 to the switch network 14 (step 226 in FIG. 13).

The VFP 32 receives the call from the ACD 18 and answers the call (step 118 in FIG. 13). The NAS 22 outpulses a subscriber's number and mode indicator as provided by the ACP 24 (step 230 in FIG. 13). The VFP 32 confirms and retrieves the subscriber's account from the subscriber profile (step 232 in FIG. 13). The ACD 18 then releases the RLT 16 to the switch network 14 so as to release the subscriber's call from the ARU 20 and the call to the VFP 32 (step 234 in FIG. 13). The switch network 14 then connects the subscriber call to the VFP call (step 236 in FIG. 13). The VFP 32 then receives the call and plays the menu for the subscriber that allows the subscriber to send a voicemail message, send a facsimile message, retrieve a voicemail message or retrieve a facsimile message. The subscriber chooses one of these options (see step 240 in FIG. 13).

Suppose that the subscriber chooses to retrieve a voicemail message. In such a case, the VFP 32 plays back voicemail messages to the subscriber, if there are any, per subscriber request (step 242 in FIG. 14A). Alternatively, the text of the voice message may be sent to printer/fax 31. Speech recognition technology may be employed to convert the voice message into text in the VFP. In this fashion, the subscriber may get a hard copy of the message or may have a fax sent to him. All of the voice messages for a subscriber may be consolidated into a single document if desired. A subscriber may also be presented with the option of using the auto-callback feature (step 244 in FIG. 14A). If the subscriber chooses not to use the auto-callback feature, script processing by the VFP continues to enable the user to listen to additional voicemail messages, delete the message, forward the message, and the like (step 246 in FIG. 14A). The auto-callback feature enables a subscriber to automatically place a call in response to the voicemail message. The subscriber may select the auto-callback feature, for example, by depressing the "#" key for at least two seconds. More generally, this feature may be selected by tone response, voice response or DTMF response. In response to this selection, the bridging switch releases the VFP 32 and originates a callback to the ARU 20 (step 248 in FIG. 14A). The switch network 14 routes the call to the ACD 18 (step 250 in FIG. 14A). The ACD 18 receives the call and an indication that the call is being reoriginated from the VFP 32. The ACD 18 queries AP 46 for routing information (step 252 in FIG. 14A). The AP 46 responds with instructions to route the call to the ARU 20 (step 254 in FIG. 14A). The ACD 18 then routes the call to the NAS 22 (step 256 in FIG. 14A). The NAS 22 receives the call and detects the tone (step 258 in FIG. 14A).

Figure 14A:
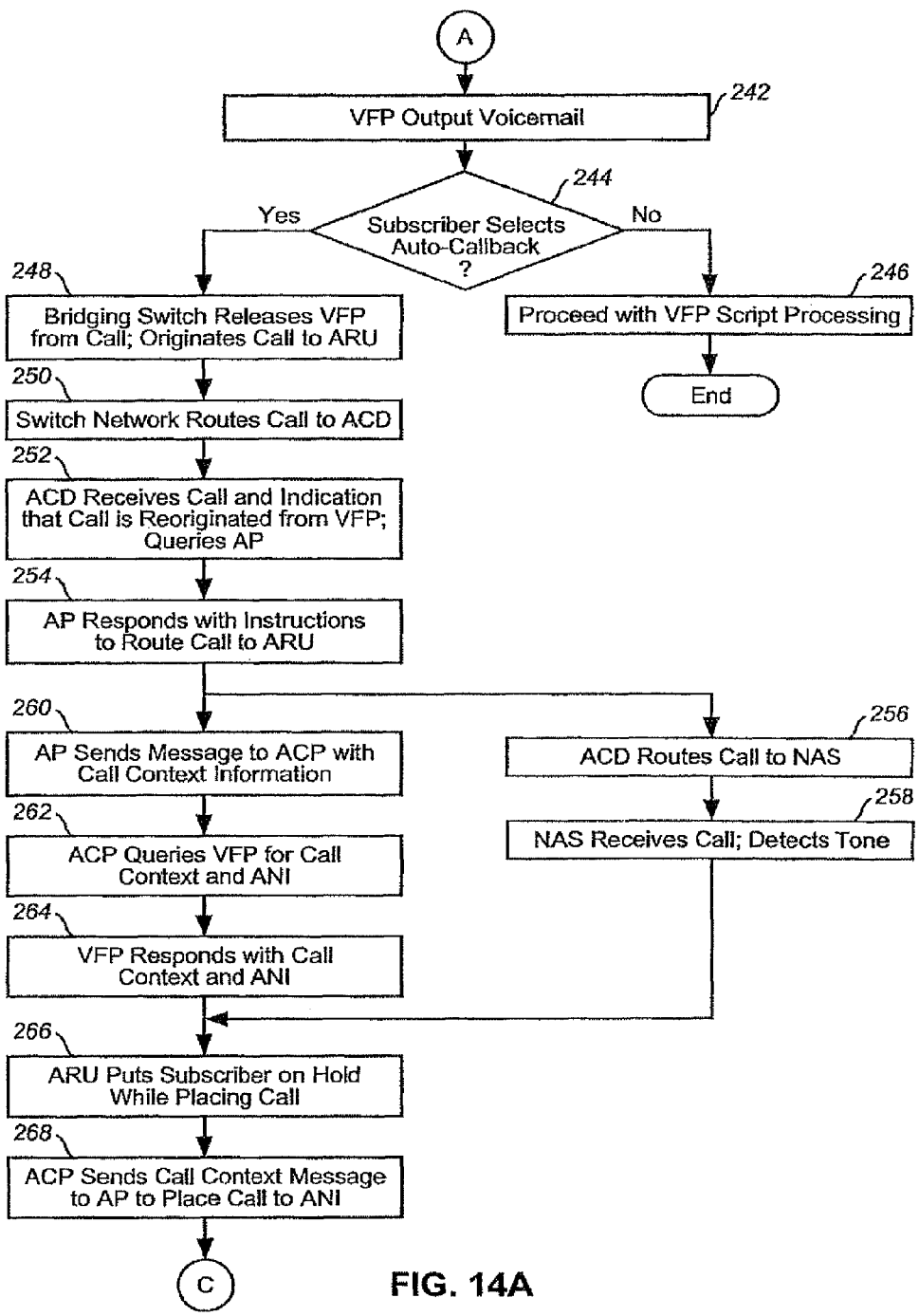
FIGS. 14A and 14B illustrate the steps that are performed when a subscriber chooses to retrieve a voicemail message.

In conjunction with the ACD's routing of the call to the NAS 22, the AP 46 sends a message to the ACP 24 that contains call context information (step 260 in FIG. 14A). The ACP 24 queries the VFP 32 for call context information and an ANI (step 262 in FIG. 14A). The VFP responds with the requested information (step 264 in FIG. 14A). The ARU 20 then puts a subscriber on hold while placing the call to the destination determined by the call context information and ANI provided by the VFP. Specifically, information regarding the phone number to which the auto-callback is to be made is received from the VFP. The ARU puts the subscriber on hold while placing the call (step 266 in FIG. 14A) and the ACP 24 sends the call context information to the AP 46 to place a call to the number designated by the ANI (step 268 in FIG. 14A). The AP 46 then sends commands to the ACD 18 to originate the call to the ANI (step 270 in FIG. 14B). The ACD 18 originates the call to the ANI via RLT 16 to switch network 14 (step 272 in FIG. 14B).

Figure 14B:
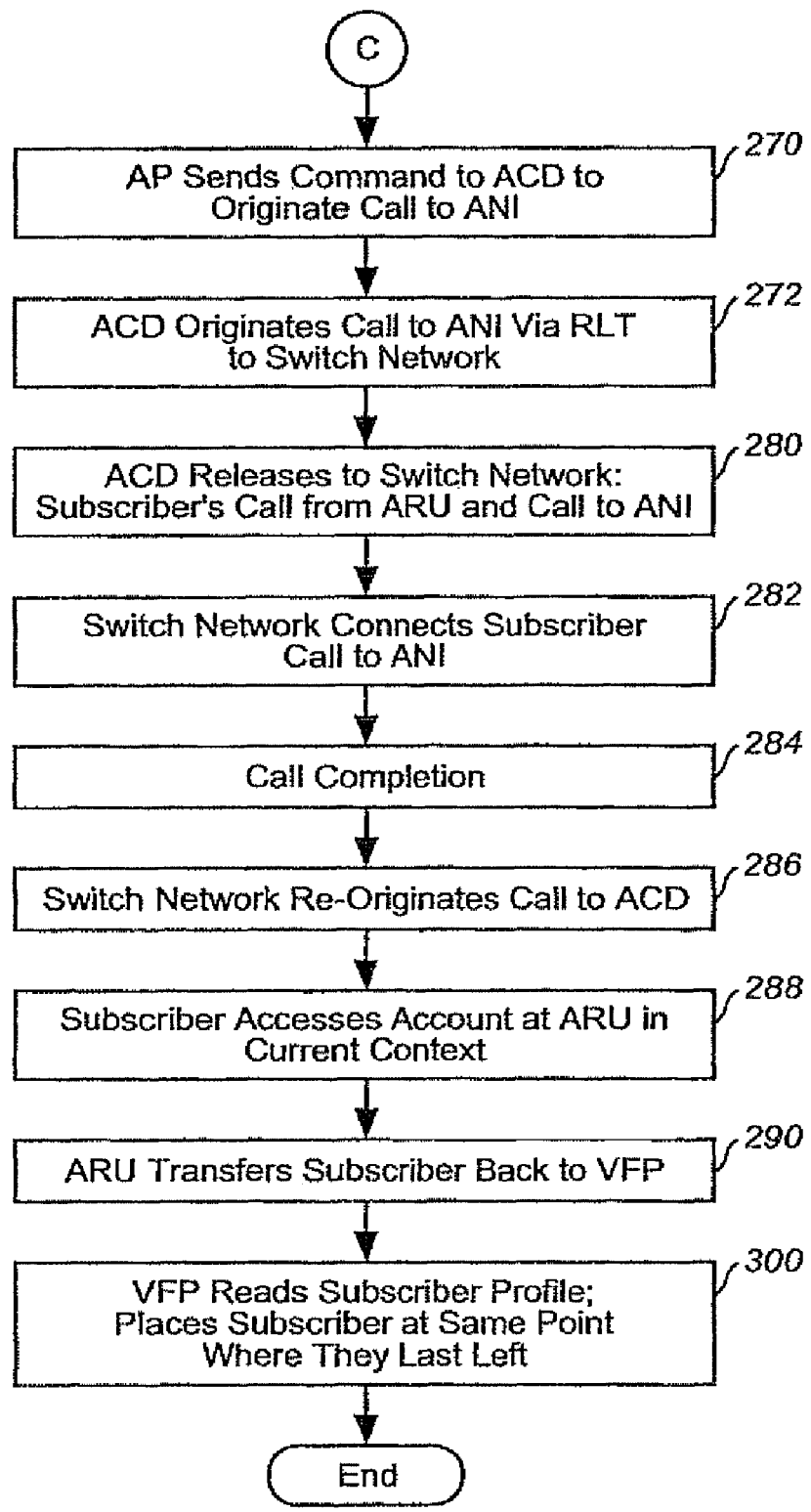

The ACD 18 releases to the switch network 14 the subscriber's call from the ARU and the call to the ANI (step 280 in FIG. 14B). The switch network 14 connects the subscriber call to the ANI (step 282 in FIG. 14B). Eventually, the call completes, such as by the subscriber hanging up the phone. However, the subscriber may stay on the line and be returned to the ARU 20. The subscriber indicates that the subscriber is interested in reoriginating the call, such as by depressing the "#" key on a phone pad for two seconds. In this case, the switch network 14 reinitiates a call to the ACD 18 using the subscriber's number (step 286 in FIG. 14B). The subscriber then accesses his account at the ARU in the current context (step 288 in FIG. 14B). In other words, the context of the ARU script processing that the subscriber left is returned to (step 288 in FIG. 14B). The ARU 20 then transfers the subscriber back to the VFP 32 (step 290 in FIG. 14B). The VFP reads the subscriber's profile and places the subscriber at the same point the subscriber was in before the auto-callback was performed (step 300 in FIG. 14B).

The subscriber may also choose to retrieve a facsimile message (see step 240 in FIG. 13). In response to a prompt from the VFP, the subscriber selects facsimile messages to receive (see step 302 in FIG. 15). The VFP 32 prompts a subscriber for the destination number from which the facsimile messages are to be retrieved (step 304 in FIG. 15). The subscriber then enters the destination number (step 306 in FIG. 15) and the VFP 32 originates a call to the destination number (step 308 in FIG. 15). If the call is not answered (see step 310 in FIG. 15), the VFP 32 notifies the subscriber that the facsimile retrieval has failed (step 312 in FIG. 15). The sending of the facsimile and the notification of failure need not be performed in real time.

It should be appreciated that facsimile messages may include electronic mail (e-mail attachments). Most computers currently support the sending and receiving of facsimile messages over modems. The e-mail attachments to facsimile messages may also be sent over the modems. An e-mail attachment may be stripped off and viewed at the destination via an e-mail program.

Figure 15:
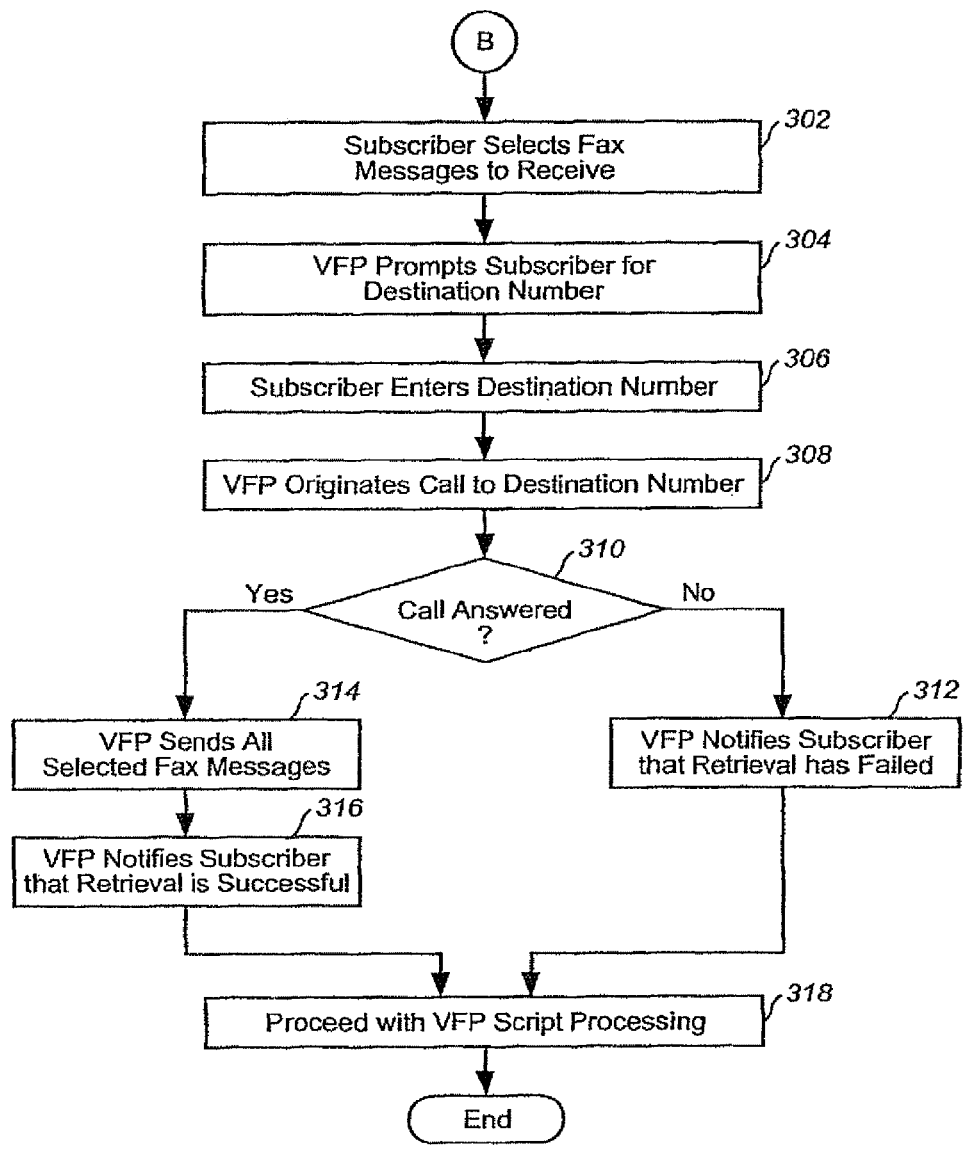
FIG. 15 is a flowchart illustrating the steps that are performed when a subscriber chooses to retrieve a facsimile message.

If, on the other hand, the call is answered (see step 310 in FIG. 15), the VFP 32 sends all the retrieved fax messages to the destination number (step 314 in FIG. 15). Subsequently, the VFP notifies the subscriber of the successful retrieval of the facsimile messages (step 316 in FIG. 15). The VFP then continues with normal script processing (step 318 in FIG. 15).

Figure 11:
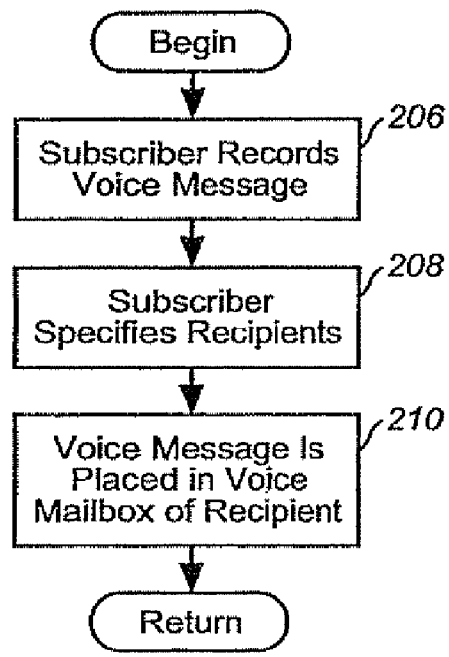
FIG. 11 is a flowchart illustrating the steps that are performed when a subscriber chooses to send a voice message.

When the subscriber wishes to send a voice message, the call is transferred to the VFP in response to the selection of a send/retrieve messages option and the VFP prompts the subscriber to enable the recording and sending of a voice message. In particular, as shown in FIG. 11, the subscriber records a voice message in response to a VFP prompt (step 206 in FIG. 11). The subscriber also specifies the recipients for the voice message (step 208 in FIG. 11). The VFP then delivers the voice message to the voicemail boxes of the designated recipients (step 210 in FIG. 11).

Figure 12:
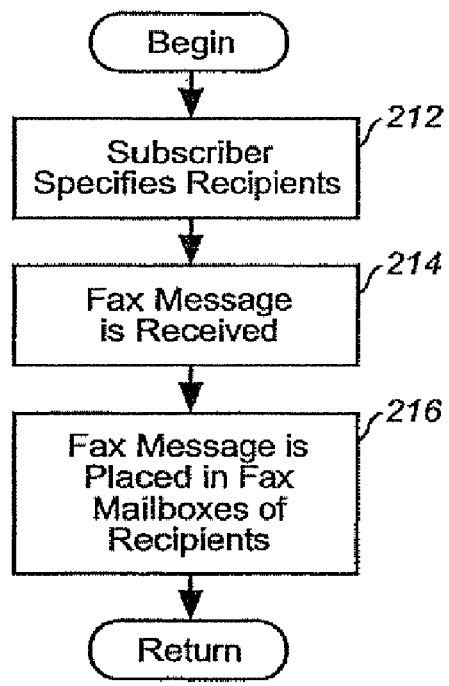
FIG. 12 is a flowchart illustrating the steps that are performed when a subscriber chooses to send a facsimile message.

The VFP 32 also enables the subscriber to send a fax message. In such a case, the subscriber specifies the recipients that are intended to receive the fax message (step 212 in FIG. 12). The facsimile messages are received by the VFP (step 214 in FIG. 12) and deposited in the facsimile mailboxes of the recipients (step 216 in FIG. 12). The user may specify delivery time and the source of the facsimile message among other options.

3. Outbound Calls

Figure 16A:
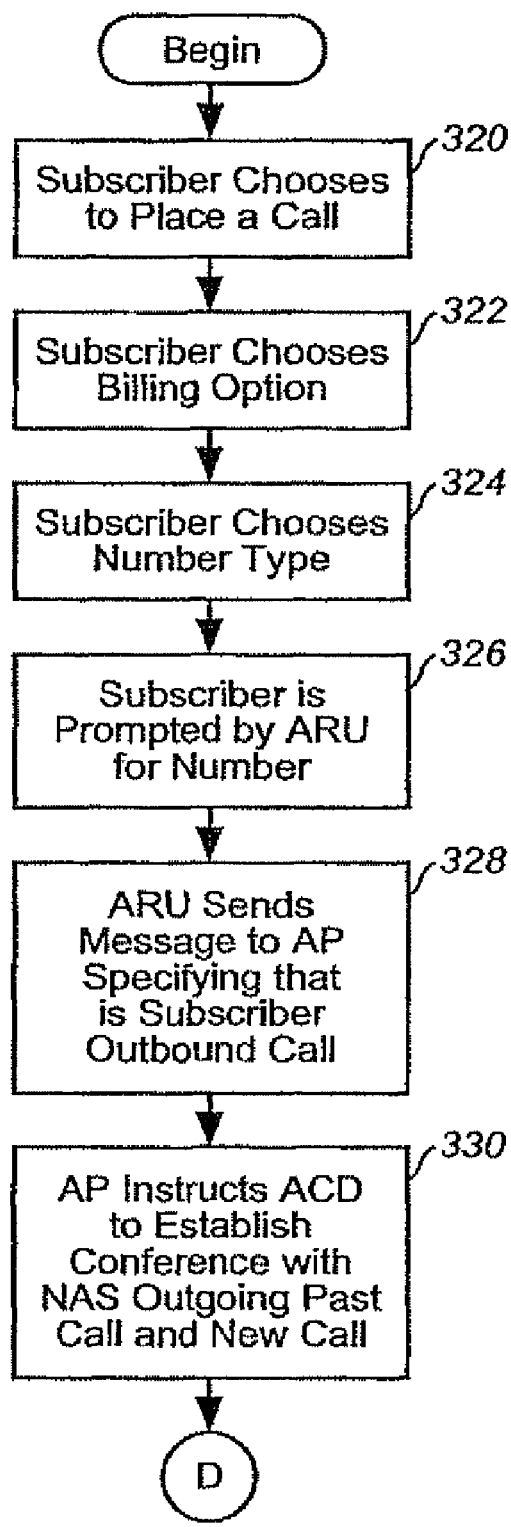
FIGS. 16A and 16B illustrate the steps that are performed when a subscriber chooses to place an outbound call via the platform.
Figure 16B:
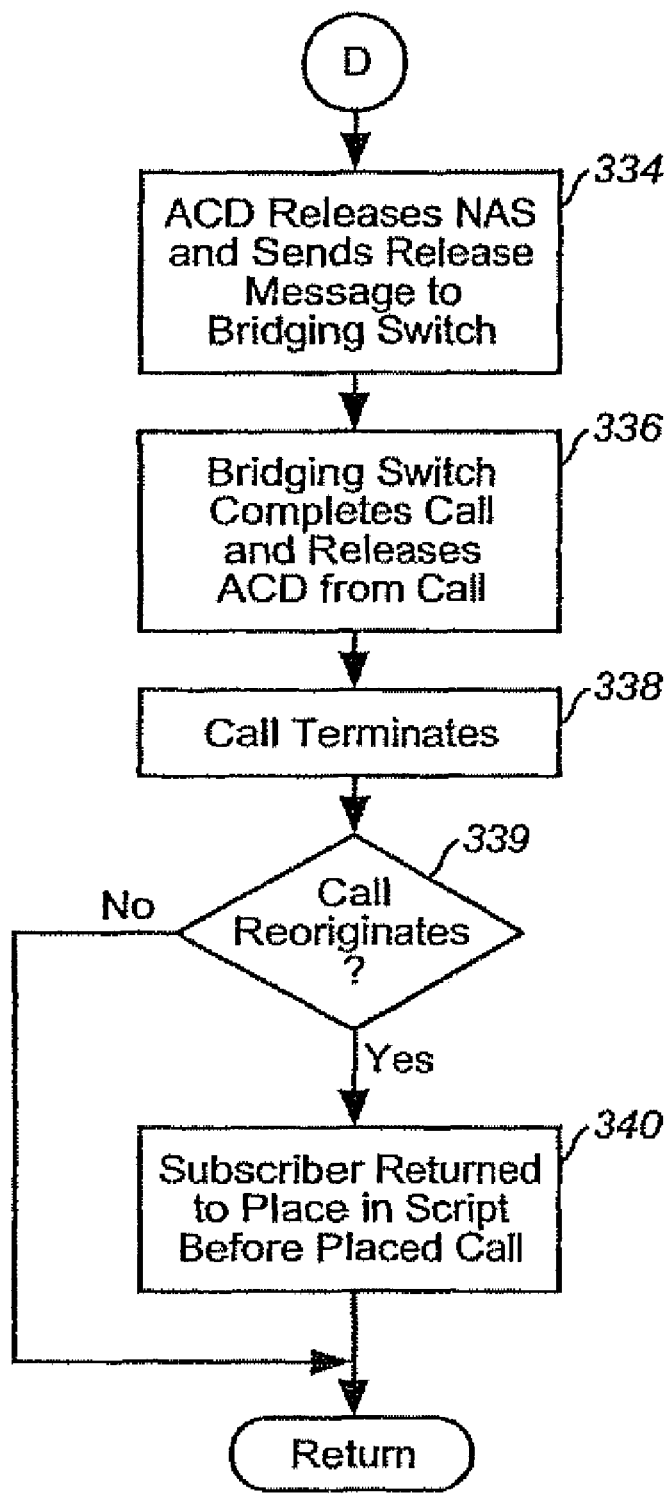

A subscriber may also place a call via the platform 10. A subscriber may place a call by selecting a speed-dial number, an international number, a domestic number or via operator assistance. Moreover, the platform may include intelligence for presenting the user with predefined phone number options and placing a call after the user has selected one of the options. All of these calls may be billed to the single account associated with the subscriber phone number. A number of other billing options may also be employed, including billing the calls to a corporate account to which other subscribers may also bill calls. These calls may also be billed to a credit card or a calling card account as specified by the subscriber. FIGS. 16A and 16B show the steps that are performed in such an instance.

A subscriber may call into their own account on the platform 10 to place one or more outbound calls. This may include domestic calls and international calls. The calls may be billed to the subscriber's account, a credit card or a calling card.

Initially, a subscriber chooses to place an outbound call. As was discussed above, this is one of the subscriber menu options that is available to a subscriber via the platform 10 (step 220 in FIG. 16A). The subscriber then implicitly or explicitly or chooses a billing option. In general, a subscriber only needs to specify a credit card number or a PIN number once in order to establish billing (step 322 in FIG. 16A). The subscriber then chooses what type of number to dial (i.e., a speed-dial number, international number or a domestic number) (step 324 in FIG. 16A). The ARU 20 prompts the user for one of these choices. The ARU 20 also prompts the user for the phone number (step 326 in FIG. 16A). The subscriber enters either the speed-dial digits for the number or enters the entire telephone number.

The platform 10 then proceeds to take steps to realize the outbound call. The ARU 20 sends a message to the AP 46 specifying that a subscriber wishes to place an outbound call (step 328 in FIG. 16A). The AP 46 then instructs the ACD 18 to establish a conference with the NAS, the originating leg of the call and the new call being originated (step 330 in FIG. 16A). The NAS 22 then outpulses the terminating telephone number for the destination to initiate the call to the destination (step 332 in FIG. 16A).

The ACD 18 releases the NAS 22 and sends a release message to the bridging switch (step 334 in FIG. 16B). The bridging switch completes the call and releases the ACD 18 from the call (step 336 in FIG. 16B). The call is eventually terminated (step 338 in FIG. 16B). The subscribers may then reoriginate to return to the user menu (steps 339 and 340 in FIG. 16B). The returning of the subscriber to the script is like that described above relative to a guest caller in FIG. 8B (see steps 162-176).

The outbound calling options are described in more detail in co-pending application entitled, "Outbound Calling Services on a Telecommunications Service Platform," which was filed on even data herewith and is assigned to a common assignee and which is explicitly incorporated by reference herein.

4. Administration

A subscriber may also access certain administrative functions by calling the platform, using the subscriber telephone number. The subscriber chooses the administration option from the subscriber menu (see step 342 in FIG. 17). The subscriber is then presented with an administration menu (step 344 in FIG. 17) which presents the subscriber the menu options of: list maintenance, record greetings, and activate/deactivate features. If the subscriber chooses the list maintenance option (see step 746 in FIG. 17) the subscriber is able to alter and review broadcast lists as well as speed-dial lists. The subscriber may instead choose to record new greetings (see step 348 in FIG. 17). This administration function allows the user to record greetings, such as the mailbox name and a welcome message (step 354 in FIG. 17).

Figure 17:
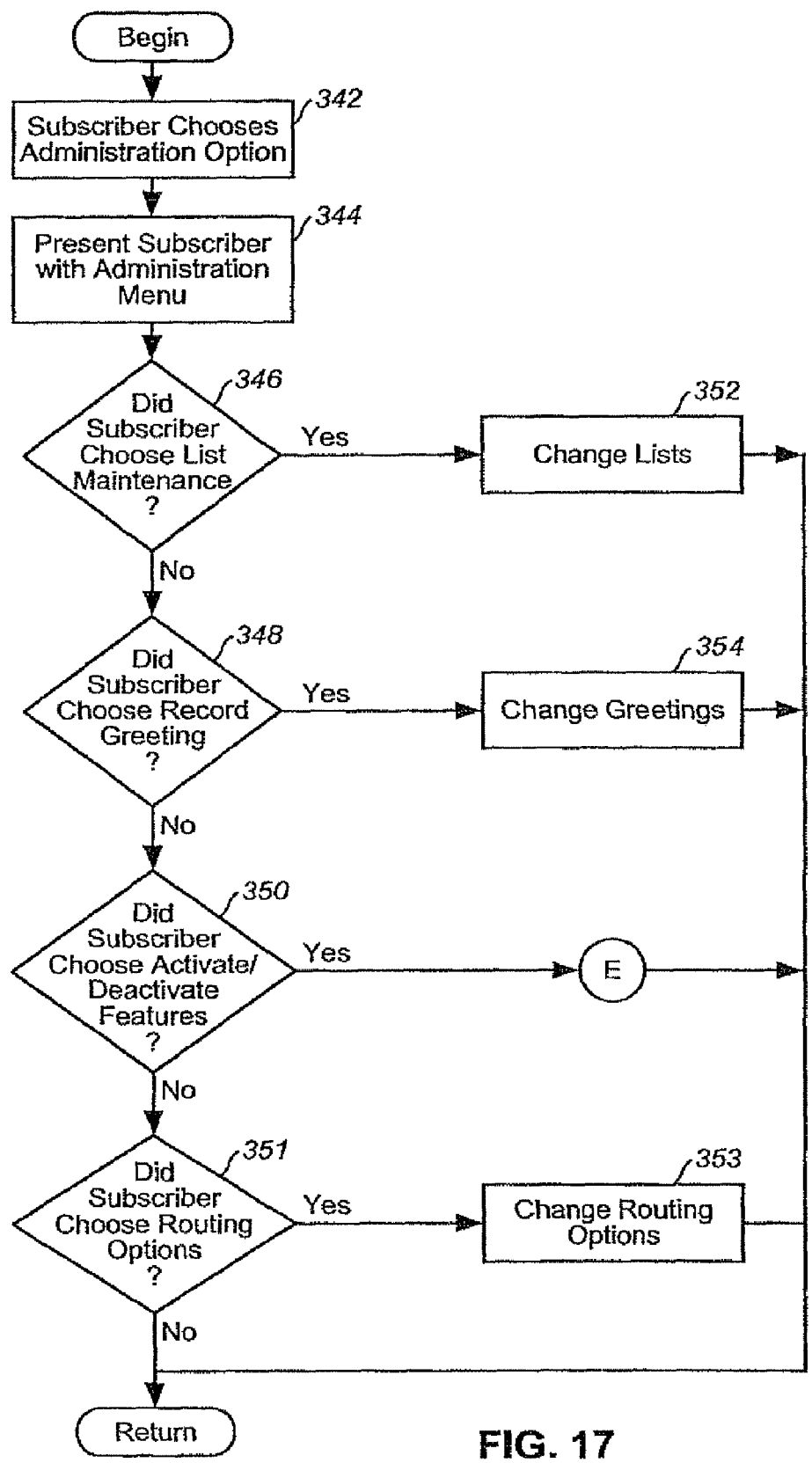
FIG. 17 is a flowchart illustrating the steps that are performed when a subscriber chooses to alter administrative options.

The administrative functions may also be used to activate and deactivate all guest menu options by choosing the activate/deactivate features option (step 350 in FIG. 17). The subscriber is then presented with a feature activation menu (step 356 in FIG. 18A). The subscriber chooses one of the menu options (step 358 in FIG. 18A), one of the options in call screening which enables the subscriber to choose the call screening options (see steps 360 and 362 in FIG. 18A). The subscriber may choose to have call screening invoked such that a guest caller is identified to the subscriber when a call is placed to the subscriber. The information may include the caller's name, the caller's ANI or both types of information. When call name screening is in place, the caller reaches the ARU 20 and processing continues until an outbound call is to be placed to the terminating number specified by the subscriber. The ARU then prompts the caller for the caller's name. The caller speaks his name and the NAS records the speaker's name. The ARU then puts a caller on hold and places the outbound call. When a live answer picks up, the ARU 20 plays the recorded message that contains the caller's spoken name and the subscriber may then choose to accept or refuse the call.

Figure 18A:
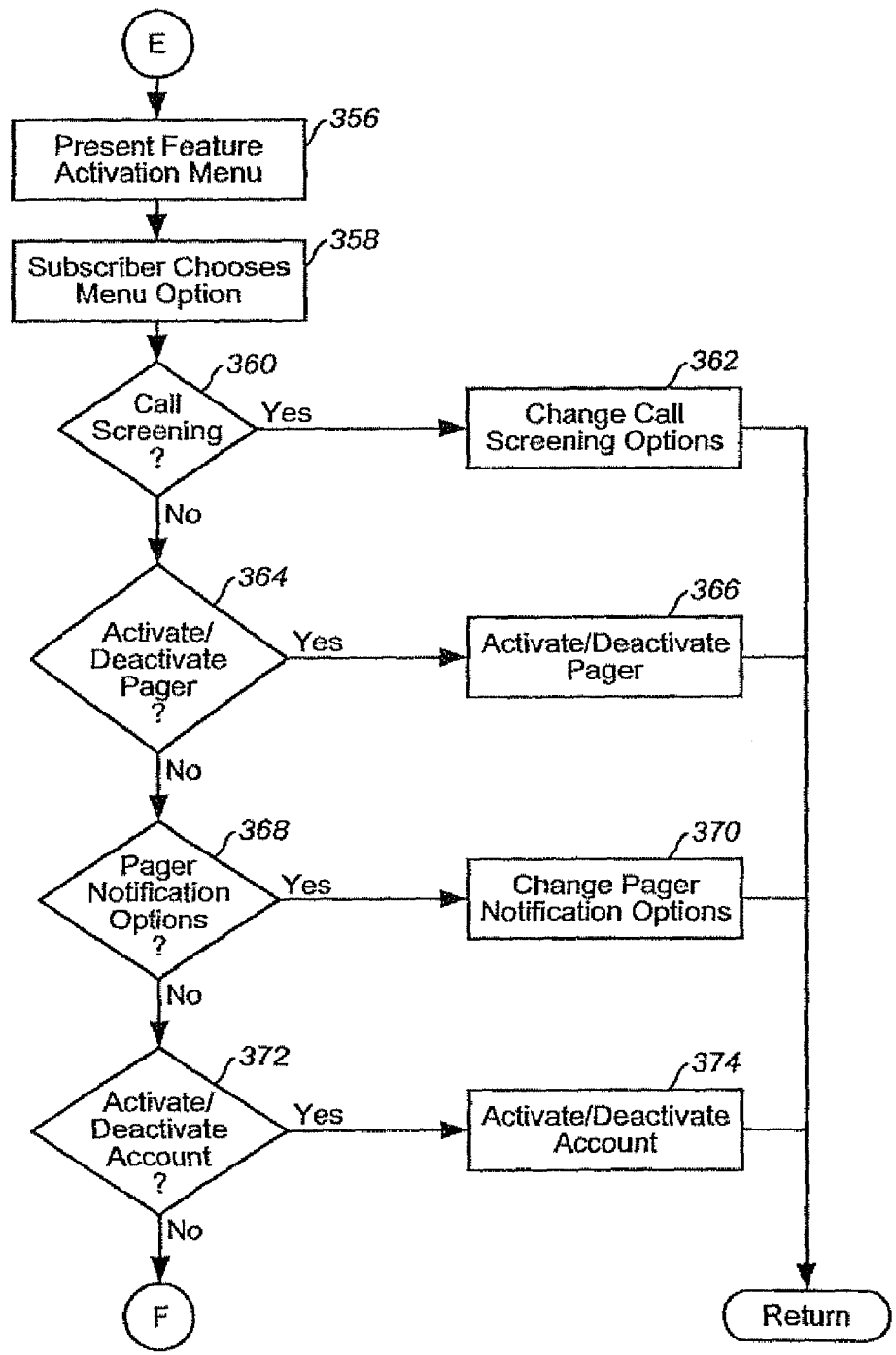
FIGS. 18A and 18B depict a flowchart that illustrates the steps that are performed when a subscriber chooses the feature activation menu to activate/deactivate features.

The subscriber may choose the option to activate/deactivate paging (step 364 in FIG. 18A). The subscriber may toggle the activation/deactivation of paging. The subscriber may also set pager options by choosing pager notification options from the menu. Pager notification can be configured to page on receipt of all new messages or only on receipt of urgent messages. One option is for the user to be sent a scrolling message of all names and telephone numbers for parties attempting to reach the subscriber. The name may be associated with the ANI of the call or may be derived by prompting the caller. The subscriber may set options to be informed of pages by voicemail only, by facsimile only, by a combination of voicemail and facsimile or may request that there be no notification (see step 370 in FIG. 18A).

The subscriber may also choose to be informed of incoming messages of all types (e.g., voicemail, faxmail, page, e-mail, video mail) while on a telephone call. The system may generate a low volume whisper message (of substantially lower volume than a typical conversation) or a tone that identifies that a message or call has arrived. The type of incoming message may be identified by the whisper message along with information regarding the content or time of arrival of the message. The ACP may be informed of the receipt of the incoming message and, in response, generate the tone or whisper message for the subscriber if the subscriber is on a phone call. The subscriber may choose the activate/deactivate account option (step 372 in FIG. 18A) to activate or deactivate the subscriber's account.

Figure 18B:
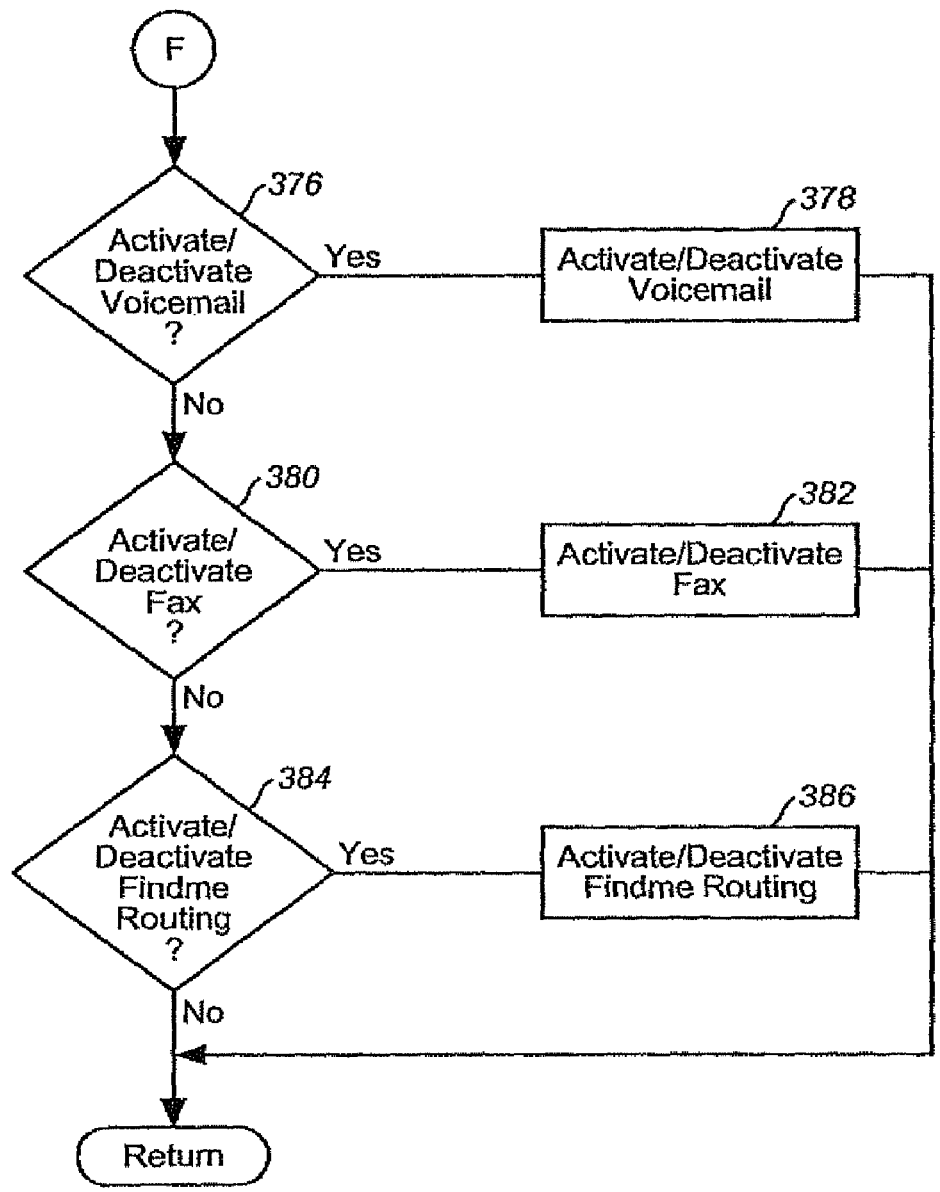

The subscriber may choose the option of activating/deactivating voicemail messaging (see steps 376 and 378 in FIG. 18B). The subscriber may toggle the activation/deactivation of facsimile messaging (step 380 and 382 in FIG. 18B). Lastly, the subscriber may activate or deactivate Findme routing (steps 384 and 386 in FIG. 18B).

The subscriber also has the option of changing routing options (step 351 in FIG. 17). Selection of this option provides the user with routing choices that enable the user to change the current routing (step 353 in FIG. 17).

While the present invention has been described with reference to a preferred embodiment thereof, those skilled in the art will appreciate that various changes in form and detail may be made without departing from the intended scope of the present invention as defined in the appended claims.

The invention claimed is:

1. A method comprising:
   providing, in a telecommunications system, a group of services that are accessible through a single phone number of a subscriber;
   offering, by a processor of the telecommunications system, a first caller of the single phone number a first subset of the group of services;
   offering a second caller of the single phone number a second subset of the group of services;
   assigning a mode indicator to a call received from the first caller or the second caller of the single phone number, wherein the mode indicator specifies a type of service associated with the call; and
   providing at least one option to the first caller or second caller based at least in part on the mode indicator assigned to the call.

2. The method of claim 1, further comprising:
   receiving the call from the first caller; and
   identifying the first caller, wherein the first subset of the group of services is provided to the first caller based on the identifying of the first caller.

3. The method of claim 2, further comprising receiving a personal identification number from the first caller, wherein the first caller is identified based at least in part on the personal identification number.

4. The method of claim 1, wherein the type of service associated with the call comprises at least one of a voicemail service, a fax with voice annotation service, a fax without voice annotation service, a paging service, a voicemail or fax retrieval service, or a maintenance service.

5. The method of claim 1, further comprising receiving, from the subscriber, an indication of which services to include in the first subset of the group of services and which services to include in the second subset of the group of services.

6. The method of claim 1, further comprising:
   receiving the call from the first caller; and
   providing the first caller with a menu that lists the first subset of the group of services.

7. The method of claim 1, further comprising:
   receiving the call from the first caller; and
   determining that the subscriber is on another call at a time when the call from the first caller is received.

8. The method of claim 7, further comprising providing an announcement to the subscriber regarding the call at the time when the call from the first caller is received.

9. The method of claim 8, wherein the announcement comprises a low volume audio announcement regarding the call from the first caller.

10. A system comprising:
    a database configured to store a subscriber profile of a subscriber; and
    a processor operatively coupled to the database and configured to:
    provide a group of services that are accessible through a single phone number of the subscriber;
    offer a first caller of the single phone number a first subset of the group of services;
    offer a second caller of the single phone number a second subset of the group of services;
    assign a mode indicator to a call received from the first caller or the second caller of the single phone number, wherein the mode indicator specifies a type of service associated with the call; and
    providing at least one option to the first caller or second caller based at least in part on the mode indicator assigned to the call.

11. The system of claim 10, wherein the processor is further configured to:
    receive the call from the first caller; and
    identify the first caller, wherein the first subset of the group of services is provided to the first caller based on the identifying of the first caller and the subscriber profile.

12. The system of claim 11, wherein the processor is further configured to receive a personal identification number from the first caller, and wherein the first caller is identified based at least in part on the personal identification number.

13. The system of claim 10, wherein the type of service associated with the call comprises at least one of a voicemail service, a fax with voice annotation service, a fax without voice annotation service, a paging service, a voicemail or fax retrieval service, or a maintenance service.

14. The system of claim 10, wherein the subscriber profile includes at least an indication of which services to include in the first subset of the group of services and which services to include in the second subset of the group of services.

15. The system of claim 10, wherein the processor is further configured to:
    receive the call from the first caller; and
    determine that the subscriber is on another call at a time when the call from the first caller is received.

16. The system of claim 15, wherein the processor is further configured to provide an announcement to the subscriber regarding the call at the time when the call from the first caller is received.

17. The system of claim 16, wherein the announcement comprises a low volume audio announcement regarding the call from the first caller.

18. A tangible computer-readable medium having computer-readable instructions stored thereon, the instructions comprising:
    instructions to provide a group of services that are accessible through a single phone number of a subscriber;
    instructions to offer a first caller of the single phone number a first subset of the group of services;
    instructions to offer a second caller of the single phone number a second subset of the group of services;
    instructions to assign a mode indicator to a call received from the first caller or the second caller of the single phone number, wherein the mode indicator specifies a type of service associated with the call; and
    providing at least one option to the first caller or second caller based at least in part on the mode indicator assigned to the call.

19. The tangible computer-readable medium of claim 18, further comprising instructions to process a received indication from the subscriber, wherein the received indication identifies which services to include in the first subset of the group of services and which services to include in the second subset of the group of services.

20. The tangible computer-readable medium of claim 18, further comprising instructions to:
    receive the call from the first caller;
    determine that the subscriber is on another call at a time when the call from the first caller is received; and
    provide an announcement to the subscriber regarding the call at the time when the call from the first caller is received, wherein the announcement comprises a low volume audio announcement regarding the call from the first caller.

* * * * *

UNITED STATES PATENT AND TRADEMARK OFFICE
CERTIFICATE OF CORRECTION

| | | |
|---|---|---|
| PATENT NO. | : 8,175,245 B2 | Page 1 of 1 |
| APPLICATION NO. | : 12/694538 | |
| DATED | : May 8, 2012 | |
| INVENTOR(S) | : Gross et al. | |

It is certified that error appears in the above-identified patent and that said Letters Patent is hereby corrected as shown below:

On the Title Page, in item (75), under "Inventors", in Column 1, Line 2, delete "Hawatha," and insert -- Hiawatha, --, therefor.

Signed and Sealed this
Twenty-third Day of October, 2012

David J. Kappos
*Director of the United States Patent and Trademark Office*